United States Patent
Peutl et al.

(10) Patent No.: US 12,534,258 B2
(45) Date of Patent: Jan. 27, 2026

(54) TRANSPORT DEVICE FOR PLANAR PACKAGING BLANKS, PACKAGING SYSTEM HAVING A PACKAGING DEVICE FOR PLANAR PACKAGING BLANKS AND METHOD FOR OPERATING THE PACKAGING SYSTEM

(71) Applicant: Krones Aktiengesellschaft, Neutraubling (DE)

(72) Inventors: August Peutl, Woerth an der Donau (DE); Andreas Hack, Osterhofen (DE); Oliver Kotz, Prien am Chiemsee (DE); Martin Wagner, Regensburg (DE); Ulrich Hansbauer, Wurmannsquick (DE)

(73) Assignee: Krones Aktiengellschaft, Neutraubling (DE)

( * ) Notice: Subject to any disclaimer, the term of this patent is extended or adjusted under 35 U.S.C. 154(b) by 0 days.

(21) Appl. No.: 18/570,438

(22) PCT Filed: Jul. 18, 2022

(86) PCT No.: PCT/EP2022/070015
§ 371 (c)(1),
(2) Date: Dec. 14, 2023

(87) PCT Pub. No.: WO2023/011899
PCT Pub. Date: Feb. 9, 2023

(65) Prior Publication Data
US 2024/0270430 A1    Aug. 15, 2024

(30) Foreign Application Priority Data

Aug. 6, 2021 (DE) .................. 10 2021 120 533.6

(51) Int. Cl.
*B65B 59/04* (2006.01)
*B25J 5/00* (2006.01)
(Continued)

(52) U.S. Cl.
CPC ............... *B65B 59/04* (2013.01); *B25J 5/005* (2013.01); *B65B 43/126* (2013.01); *B65B 43/145* (2013.01); *B65G 17/12* (2013.01)

(58) Field of Classification Search
CPC ...... B25J 5/005; B62D 63/04; B65B 2210/02; B65B 43/126; B65B 43/145; B65B 59/04;
(Continued)

(56) References Cited

U.S. PATENT DOCUMENTS 4,195,963 A * 4/1980 Levkoff ............... B65G 1/00
108/53.5
5,386,981 A * 2/1995 Sugimoto .............. B41F 13/54
271/189
(Continued)

FOREIGN PATENT DOCUMENTS

CN 212049341 U 12/2020
DE 102014205677 A1 10/2015
(Continued)

OTHER PUBLICATIONS

Machine translation of JP H07285434 A (Year: 1994).*
(Continued)

*Primary Examiner* — Himchan Song
(74) *Attorney, Agent, or Firm* — Simmons Perrine PLC

(57) ABSTRACT

A transport device (1) for planar packaging blanks is disclosed. The transport device (1) comprises at least one driverless transport vehicle (7) and at least one adapter (3). The at least one driverless transport vehicle (7) is designed
(Continued)

to carry the at least one adapter (3). Furthermore, the at least one adapter (3) is designed to hold at least one stack (5) of planar packaging blanks.

<div style="text-align: center">17 Claims, 29 Drawing Sheets</div>

(51) Int. Cl.
  *B65B 43/12* (2006.01)
  *B65B 43/14* (2006.01)
  *B65G 17/12* (2006.01)

(58) Field of Classification Search
  CPC .......... B65H 2301/42252; B65H 2301/42256; B65H 2301/42264; B65H 2701/176
  See application file for complete search history.

(56) References Cited

U.S. PATENT DOCUMENTS

| | | | |
|---|---|---|---|
| 5,630,309 | A | 5/1997 | Blidung et al. |
| 7,591,120 | B2 | 9/2009 | Hafker et al. |
| 12,246,958 | B2 | 3/2025 | Goncalves et al. |
| 2007/0028934 | A1 | 2/2007 | Hafker et al. |
| 2016/0375813 | A1 | 12/2016 | Colantonio et al. |
| 2019/0270531 | A1 | 9/2019 | Dennemarck et al. |
| 2020/0156868 | A1* | 5/2020 | Bidram ................ B65G 1/0492 |
| 2022/0251881 | A1* | 8/2022 | Iwamoto .............. A47B 88/407 |
| 2022/0289505 | A1 | 9/2022 | Behling et al. |
| 2022/0388267 | A1* | 12/2022 | Carboni ............. B65H 31/3045 |
| 2023/0062304 | A1 | 3/2023 | Bidram et al. |

FOREIGN PATENT DOCUMENTS

| | | |
|---|---|---|
| DE | 102014112341 A1 | 3/2016 |
| DE | 102017203603 A1 | 9/2018 |
| DE | 202017006527 U1 | 3/2019 |
| DE | 102020124945 A1 * | 3/2022 |
| EP | 3123257 B1 | 9/2018 |
| EP | 3636567 B1 | 4/2021 |
| JP | S60158026 A | 8/1985 |
| JP | H07285434 A * | 10/1995 |

OTHER PUBLICATIONS

Machine translation of DE 102020124945 A1 (Year: 2020).*
PCT/EP2022/070015—International Preliminary Report on Patentability dated Feb. 15, 2024.
PCT Application: PCT/EP2022/070015 Filed Jul. 18, 2022—International Search Report dated Mar. 30, 2023.
PCT Application: PCT/EP2022/070015 Filed Jul. 18, 2022—Partial Search Report with Preliminary Opinion dated Dec. 5, 2022.
Priority Application: DE 10 2021 120 533.6 Filed Aug. 5, 2021—German Search Report dated Jun. 23, 2022.
First Chinese Office Action dated Sep. 26, 2025.

* cited by examiner

TRANSPORT DEVICE FOR PLANAR PACKAGING BLANKS, PACKAGING SYSTEM HAVING A PACKAGING DEVICE FOR PLANAR PACKAGING BLANKS AND METHOD FOR OPERATING THE PACKAGING SYSTEM

CLAIM OF PRIORITY

The present application claims priority to International Application PCT/EP2022/070015 dated Jul. 18, 2022, which in turn claims priority to German Application DE 10 2021 120 533.6 dated Aug. 6, 2021, which are incorporated by reference.

FIELD OF THE INVENTION

The present invention relates to a transport device for planar packaging blanks, a packaging system, and a method for operating a packaging system.

BACKGROUND OF THE INVENTION

There are different types of packaging for processing, arranging, grouping and packaging articles, such as beverage containers. If certain articles, such as beverage containers designed as PET containers with small wall thicknesses, have a low dimensional stability, such beverage containers are often placed in practice on packaging blanks formed by cardboard and/or paperboard in order to counteract unwanted damage to such beverage containers during their transport. Packaging blanks of this kind are also referred to as trays or PADs and can optionally have edge regions which are folded upward as part of the packaging of the articles or beverage containers.

Packaging blanks are also known which are formed only by a planar support without an edge region, wherein the individual articles or, if applicable, a corresponding arrangement formed from a plurality of articles sits on the planar support. The corresponding article sitting on the tray or packaging blank, or the corresponding arrangement of articles sitting on the tray or packaging blank, can then be encased with a thermoplastic packaging film, whereupon the corresponding arrangement of articles sitting on the tray or PAD is introduced into a shrink tunnel and the thermoplastic packaging material is shrunk onto the corresponding article or onto the corresponding arrangement of articles.

A device by which articles can be placed on planar packaging blanks or onto trays is known, for example, from the German patent application with the publication number DE 10 2014 112 341 A1. This known packaging device comprises a first continuous conveyor apparatus with an upper run and a lower run. The first endless conveyor apparatus comprises at least one circulating conveyor chain for transporting articles arranged on a tray in a first operating mode. In a second operating mode, the packaging device is provided for transporting articles and/or article groups without a packaging base.

Another device of the generic type is disclosed by DE 10 2017 203 603 A1. The device known from the German patent application is provided for placing individual articles or arrangements of articles on planar packaging blanks formed by cardboard and/or paperboard. A component of the device is a provision, by which a stack of planar packaging blanks formed by cardboard and/or paperboard can be presented. Via a feed, the planar packaging blanks formed by cardboard and/or paperboard are removed from a corresponding stack and introduced into a transport path of the articles, whereupon individual articles or article groups move onto the packaging blanks introduced into the transport path.

In all devices known from the prior art, a new stack of planar packaging blanks must in each instance be introduced into the packaging device if a stock of planar packaging blanks of a corresponding stack is exhausted or if all the packaging blanks of a corresponding stack are used up. To date, corresponding new stacks of planar packaging blanks are arranged on a pallet for this purpose and are introduced, if necessary by a user, into the corresponding packaging device. Corresponding possibilities with which a packaging device can be supplied with new stacks of planar packaging blanks with reduced personnel effort would therefore be desirable. Furthermore, it would be desirable if such a packaging device can be supplied with new stacks of planar packaging blanks easily and with little time expenditure.

For this reason, an object of the invention can be seen in providing a possibility with which packaging devices can be supplied with new stacks of planar packaging blanks with reduced personnel effort, easily and with relatively little time expenditure.

SUMMARY OF THE INVENTION

The above object is achieved by the subject matter which comprises the features in the independent claims. Advantageous embodiments are described by the dependent claims.

The invention relates to a transport device for planar packaging blanks. The planar packaging blanks can thereby be formed by planar packaging blanks made of cardboard and/or paperboard and form a support surface for a plurality of articles. The planar packaging blanks can also have lateral tabs that can be folded upward in order to be able to hold articles packaged by a corresponding planar packaging blank in a form-fitting manner.

The transport device comprises at least one driverless transport vehicle and at least one adapter.

In practice, such driverless transport vehicles, or DTVs or AGVs, have their own drive and are guided in a contactless manner. The at least one driverless transport vehicle can thereby be designed to detect an inductive guide line, which the at least one driverless transport vehicle can independently follow or along which the at least one driverless transport vehicle can move forward independently. It is also conceivable that the at least one driverless transport vehicle detects its corresponding actual position by GPS and can move forward independently, taking into account the corresponding detected actual position. In further embodiments, the at least one driverless transport vehicle can additionally or alternatively have a laser navigation system, via which the at least one driverless transport vehicle can orient itself and subsequently move independently or autonomously.

Additionally or alternatively thereto, it can also be provided that the at least one driverless transport vehicle has at least one camera, via which at least one camera the at least one driverless transport vehicle can detect its corresponding actual position and can move forward independently, taking into account the corresponding detected actual position, and/or that the at least one driverless transport vehicle has at least one ultrasonic sensor, via which at least one ultrasonic sensor the at least one driverless transport vehicle can detect its corresponding actual position and can move forward independently, taking into account the corresponding detected actual position, and/or that the at least one driverless transport vehicle is designed to detect a magnetic strip or a guide line laid by a magnetic strip for the at least one driverless transport vehicle, along which guide line the at least one driverless transport vehicle can move forward independently.

In practice, there are also further possibilities with which a driverless transport vehicle can orient itself and optionally move forward independently. Not all of these options have been listed above.

It is provided that the at least one driverless transport vehicle is prepared or designed to carry the at least one adapter. The at least one driverless transport vehicle and the at least one adapter can therefore correspond to one another, so that the at least one driverless transport vehicle can carry the at least one adapter.

Furthermore, it is provided that the at least one adapter is designed to hold at least one stack of planar packaging blanks. The at least one adapter can accordingly be designed such that the at least one adapter can be placed onto the at least one driverless transport vehicle.

The at least one driverless transport vehicle and the at least one adapter can thereby correspond to one another in such a way that the at least one adapter rests in a predetermined relative position on the at least one driverless transport vehicle when the at least one adapter is carried by the at least one driverless transport vehicle. Alternatively or additionally, a mass of the at least one adapter can be held completely by the at least one driverless transport vehicle when the at least one adapter is carried by the driverless transport vehicle.

Embodiments in which the at least one driverless transport vehicle and the at least one adapter can be separated from one another have also proven useful. In particular, the at least one driverless transport vehicle and the at least one adapter can be separated from one another without tools. The at least one driverless transport vehicle can be designed to independently establish a releasable mechanical connection to the at least one adapter, via which mechanical connection the at least one adapter is fixed to the at least one driverless transport vehicle. Alternatively or additionally, the at least one driverless transport vehicle can be designed to independently release an already produced mechanical connection to the at least one adapter, via which mechanical connection the at least one adapter is fixed to the at least one driverless transport vehicle.

Alternatively, the at least one driverless transport vehicle and the at least one adapter can be fixedly connected to one another via fixing device, wherein a working tool is required to release the fixing device. The fixing device can, for example, be designed via screw connections, via which the at least one adapter is fixed to the at least one driverless transport vehicle. Furthermore, fixing device designed, for example, by clamping connections are known to a person skilled in the art, which fixing device can only be released with the aid of a working tool and via which fixing device designed by clamping connections a fixed connection can be established between the at least one adapter and the at least one driverless transport vehicle.

Furthermore, the at least one adapter can comprise at least one circulatingly driven conveyor moving at least one corresponding held stack of planar packaging blanks, which at least one circulatingly driven conveyor is formed in particular by at least one mat belt. In further embodiments, the at least one circulatingly driven conveyor can also be formed, for example, by at least one transport belt, by at least one chain and/or by at least one belt, which is designed to hold the corresponding at least one stack of planar packaging blanks while they are standing or lying down and is guided in a circulating manner.

Embodiments in which the at least one adapter is designed to fix in place the corresponding at least one held stack of planar packaging blanks have also proven useful. In this case, for example, the at least one adapter for fixing in place the corresponding at least one held stack of planar packaging blanks can comprise at least one liftable and lowerable punch and which at least one liftable and lowerable punch is designed for placing onto a topmost planar packaging blank of the corresponding at least one held stack of planar packaging blanks in a force-applying manner. The at least one punch can be movable, for example, by a corresponding pneumatic cylinder or bellows cylinder designed as a component of the at least one adapter. The at least one liftable and lowerable punch can be movable by a corresponding lifting spindle designed as a component of the at least one adapter or by a corresponding scissor lift designed as a component of the at least one adapter.

Alternatively or additionally, for example, the at least one adapter for fixing in place the corresponding at least one held stack of planar packaging blanks can comprise a plurality of stops, which plurality of stops can be brought into contact from a plurality of sides with a corresponding held stack of planar packaging blanks.

Furthermore, the at least one driverless transport vehicle and the at least one adapter carried by the at least one driverless transport vehicle are coupled to one another via an interface for data exchange and/or for electrical power supply of the at least one adapter and/or pneumatically. For example, the at least one driverless transport vehicle can form a plug and the at least one adapter carried by the at least one driverless transport vehicle can comprise a mating plug, wherein the plug and the mating plug are plugged into one another to form the interface. Additionally or alternatively, it is also conceivable that the at least one adapter and the at least one driverless transport vehicle communicate with one another wirelessly and, for example, via Bluetooth for data exchange.

Embodiments have also proven useful in which the at least one adapter and/or the at least one driverless transport vehicle has a tilt mechanism via which the corresponding at least one stack of planar packaging blanks held via the at least one adapter can be pivoted about a horizontally oriented axis. In particular, the tilt mechanism can be designed as a component of the at least one driverless transport vehicle, wherein the at least one driverless transport vehicle can pivot the entire or complete at least one adapter, which the at least one driverless transport vehicle carries, about a horizontally oriented axis via its tilt mechanism. Such embodiments would be advantageous if the at least one stack of planar packaging blanks is to be transferred to a packaging device in a region which is tilted or rises or falls relative to horizontal.

In various embodiments, the at least one driverless transport vehicle can be designed to receive an adapter independently. Alternatively or additionally, the at least one driverless transport vehicle can be designed to independently set down an adapter carried up until then by the at least one driverless transport vehicle. In this case, the at least one adapter can come into contact with a floor surface when being set down by the at least one driverless transport vehicle.

In this case, the at least one driverless transport vehicle can be designed to independently receive an adapter from a rack on which the at least one adapter rests. Alternatively or additionally, the at least one driverless transport vehicle can be designed to independently set down an adapter, carried up until then by the at least one driverless transport vehicle, on a rack.

Furthermore, the at least one driverless transport vehicle and/or the at least one adapter can have a lifting mechanism, via which lifting mechanism the at least one adapter can be lifted relative to the at least one transport vehicle for independent reception, so that the at least one adapter loses a surface contact with a support surface present until then. The support surface can furthermore be formed by a floor surface or by a rack.

Alternatively or additionally, the at least one driverless transport vehicle and the at least one adapter can interact via a centering mechanism, which centering mechanism can align the at least one adapter relative to the at least one driverless transport vehicle during independent reception via the at least one driverless transport vehicle.

Alternatively or additionally, the at least one driverless transport vehicle and the at least one adapter can interact via a clamping bolt and a clamping mechanism, via which clamping bolt and clamping mechanism the at least one adapter can be fixed at least largely immovably to the at least one driverless transport vehicle or via which the at least one adapter is fixable at least largely immovably to the at least one driverless transport vehicle.

Furthermore, the at least one adapter can be designed to receive at least two stacks of planar packaging blanks in at least two planes offset relative to one another in the vertical direction. In this case, the at least one adapter can form, in each of the at least two planes that are offset relative to one another in the vertical direction, at least one circulatingly driven conveyor moving a stack of planar packaging blanks held in the corresponding plane. The at least one circulatingly driven conveyor formed in the corresponding plane can in each instance be formed by at least one mat belt.

It is further conceivable that the at least one adapter has a plurality of fork prongs which are designed to hold the at least one stack of planar packaging blanks. Such embodiments have proven useful in being able to receive or hold the at least one stack in a simple manner. In this case, the at least one driverless transport vehicle can be designed to raise and lower the at least one adapter, which is carried by the at least one driverless transport vehicle and has the plurality of fork prongs.

It is also conceivable that the transport device comprises a multi-axis robot which is arranged on the at least one adapter or on the at least one driverless transport vehicle and is designed for gripping at least one stack of planar packaging blanks to be held and positioning a gripped stack of planar packaging blanks on the at least one adapter carried in this case via the at least one driverless transport vehicle. The multi-axis robot can optionally be fixedly connected to the at least one adapter or fixedly connected to the at least one driverless transport vehicle. Such a fixed connection can be designed such that the fixed connection must be released using a tool if the multi-axis robot is to be removed or dismounted from the at least one driverless transport vehicle or from the at least one adapter. For example, the fixed connection can be at least one screw connection, via which the multi-axis robot is fixed to the at least one adapter or to the at least one driverless transport vehicle. It is conceivable that the multi-axis robot has a plurality of gripping fingers, via which the multi-axis robot can grip the corresponding at least one stack of planar packaging blanks to be held. In particular, the multi-axis robot can have a pinching gripper, via which the multi-axis robot can grip the corresponding at least one stack of planar packaging blanks to be held.

The invention also relates to a packaging system. The packaging system comprises at least one packaging device, which is designed to be at least one packaging device for packaging article arrangements with planar packaging blanks. The packaging system further comprises at least one blank supply, which is designed to provide at least one stack of planar packaging blanks. At least one transport device according to an exemplary embodiment of the preceding description is also a component of the packaging system.

The packaging device can be designed to remove a corresponding planar packaging blank arranged on the top of a stack of planar packaging blanks. Furthermore, the packaging device can be designed to introduce a corresponding removed planar packaging blank into a transport path of a corresponding article arrangement, so that a corresponding article arrangement moves onto a corresponding planar packaging blank that has been removed and introduced into the transport path.

In the packaging system, it is provided that the at least one transport device is designed to bring a corresponding stack of planar packaging blanks provided via the at least one blank supply to the at least one packaging device.

In various embodiments, the packaging system can comprise at least one first packaging device, which is designed to be at least one first packaging device for packaging article arrangements with planar packaging blanks. In addition, the packaging system can comprise at least one second packaging device, which is designed to be at least one second packaging device for packaging further article arrangements with planar packaging blanks. In this case, at least one specific driverless transport vehicle or DTV can be provided, which at least one specific driverless transport vehicle is designed to bring a corresponding stack of planar packaging blanks from the at least one blank supply to either the at least one first packaging device or to the at least one second packaging device via a corresponding carried adapter. The at least one specific driverless transport vehicle or DTV is designed both for supplying the at least one first packaging device with stacks of planar packaging blanks and for supplying the at least one second packaging device with stacks of planar packaging blanks.

Furthermore, the packaging device can comprise at least one stack buffer, which has a plurality of receptacles arranged one above the other in the vertical direction. The receptacles arranged one above the other in the vertical direction can be designed in such a way that at least one stack of planar packaging blanks can be stored via a corresponding receptacle. In this case, it can in particular be provided that the packaging device comprises at least one stack elevator, via which stacks of planar packaging blanks can be introduced into the receptacles arranged one above the other in the vertical direction.

The invention also relates to a method for operating a packaging system, which comprises at least one packaging device and at least one blank supply. Features which have already been described above with regard to various embodiments of the packaging system and to various embodiments of the transport device can also be provided in the embodiments of the method according to the invention described below and are not mentioned repeatedly. Likewise, features described below for various embodiments of the method according to the invention can be provided in the previously described embodiments of the transport device according to the invention and the packaging system according to the invention without being mentioned again.

In the method, it is provided that at least one stack of planar packaging blanks is provided via the at least one blank supply. The at least one blank supply can have at least one manipulator that is designed to be at least one manipulator for removing stacks of planar packaging blanks from a pallet and for positioning stacks of planar packaging blanks on the at least one adapter of a transport device. The at least one manipulator can be formed by at least one multi-axis robot.

Furthermore, it is provided that the provided stack of planar packaging blanks is retrieved from the at least one blank supply and is transferred to at least one packaging device, wherein the at least one packaging device packages article arrangements with planar packaging blanks of the transferred stack.

The at least one packaging device can comprise at least one transfer module, wherein it is provided that the provided stack of planar packaging blanks is retrieved from the at least one blank supply and is transferred to the at least one transfer module. The transfer module can guide a corresponding stack of planar packaging blanks to a packaging module of the packaging device, which packaging module packages article arrangements with planar packaging blanks of the corresponding stack, which stack was guided to the packaging module by the at least one transfer module. The at least one transfer module can comprise a stack centerer and/or a stack buffer.

In the implementation of the method, at least one driverless transport vehicle and at least one adapter are provided. It is further provided that the at least one driverless transport vehicle carries the at least one adapter, which at least one adapter holds at least one stack of planar packaging blanks, which the driverless transport vehicle moves from the at least one blank supply to the at least one packaging device, whereupon the stack of planar packaging blanks, which is still held via the at least one adapter until then, is transferred from the at least one adapter to the at least one packaging device. As already mentioned above, the stack of planar packaging blanks held via the at least one adapter can be transferred from the at least one adapter to at least one transfer module of the at least one packaging device.

In various embodiments, at least one conveyor designed as a component of the at least one adapter can be driven in a circulating manner, as a result of which the stack of planar packaging blanks, which is still held by the at least one adapter until then, is transferred to the at least one packaging device. The at least one circulatingly driven conveyor can be, for example, a mat belt.

It can also be provided that stacks of planar packaging blanks are provided via the at least one blank supply and in this case are already held by the at least one adapter. In this case, the at least one driverless transport vehicle drives under the at least one adapter together with the stack of planar packaging blanks already held via the at least one adapter in the region of the at least one blank supply, whereupon the at least one adapter is raised together with the stack of planar packaging blanks already held, so that the at least one adapter loses its contact with a support surface and is then carried via the at least one driverless transport vehicle. The support surface can thereby be formed by a floor surface or by a rack.

It is further conceivable that the at least one adapter fixes in place the at least one held stack of planar packaging blanks and in this case in particular comprises at least one liftable and lowerable punch. To fix in place the at least one held stack of planar packaging blanks in a clamping manner, the at least one liftable and lowerable punch can press in a force-applying manner in the direction from above against a planar packaging blank arranged at the top of the corresponding at least one held stack of planar packaging blanks.

It is also conceivable that the at least one adapter, which is carried by the at least one driverless transport vehicle, holds a plurality of stacks of planar packaging blanks in at least two planes offset in the vertical direction relative to one another, which plurality of stacks of planar packaging blanks the at least one driverless transport vehicles brings from the at least one blank supply to the at least one packaging device, whereupon the plurality of stacks of planar packaging blanks, which are still held until then by the at least one adapter in at least two planes offset in the vertical direction relative to one another, are transferred from the at least one adapter to the at least one packaging device.

Furthermore, in the method, at least one stack buffer can be provided, which has a plurality of receptacles arranged one above the other in the vertical direction. In the method, in addition, the stack of planar packaging blanks transferred from the at least one adapter to the at least one packaging device can be brought to a vertical level of a specific receptacle of the plurality of receptacles via a platform of a stack elevator, and it can be introduced into the specific receptacle at the specific vertical height level via the platform and stored in the specific receptacle, until planar packaging blanks of the stored stack are required for packaging article arrangements. Following this, the stack of planar packaging blanks stored up to that point can be released via the at least one stack buffer and moved in the direction of a packaging module of the packaging device, which then packages article arrangements with planar packaging blanks of the stack.

BRIEF DESCRIPTION OF THE FIGURE

Exemplary embodiments of the invention and their advantages are explained in more detail below with reference to the accompanying figures. The proportions of the individual elements relative to one another in the figures do not always correspond to the actual proportions, since some forms are simplified, while other forms are shown enlarged in relation to other elements for better illustration.

Figure 1:
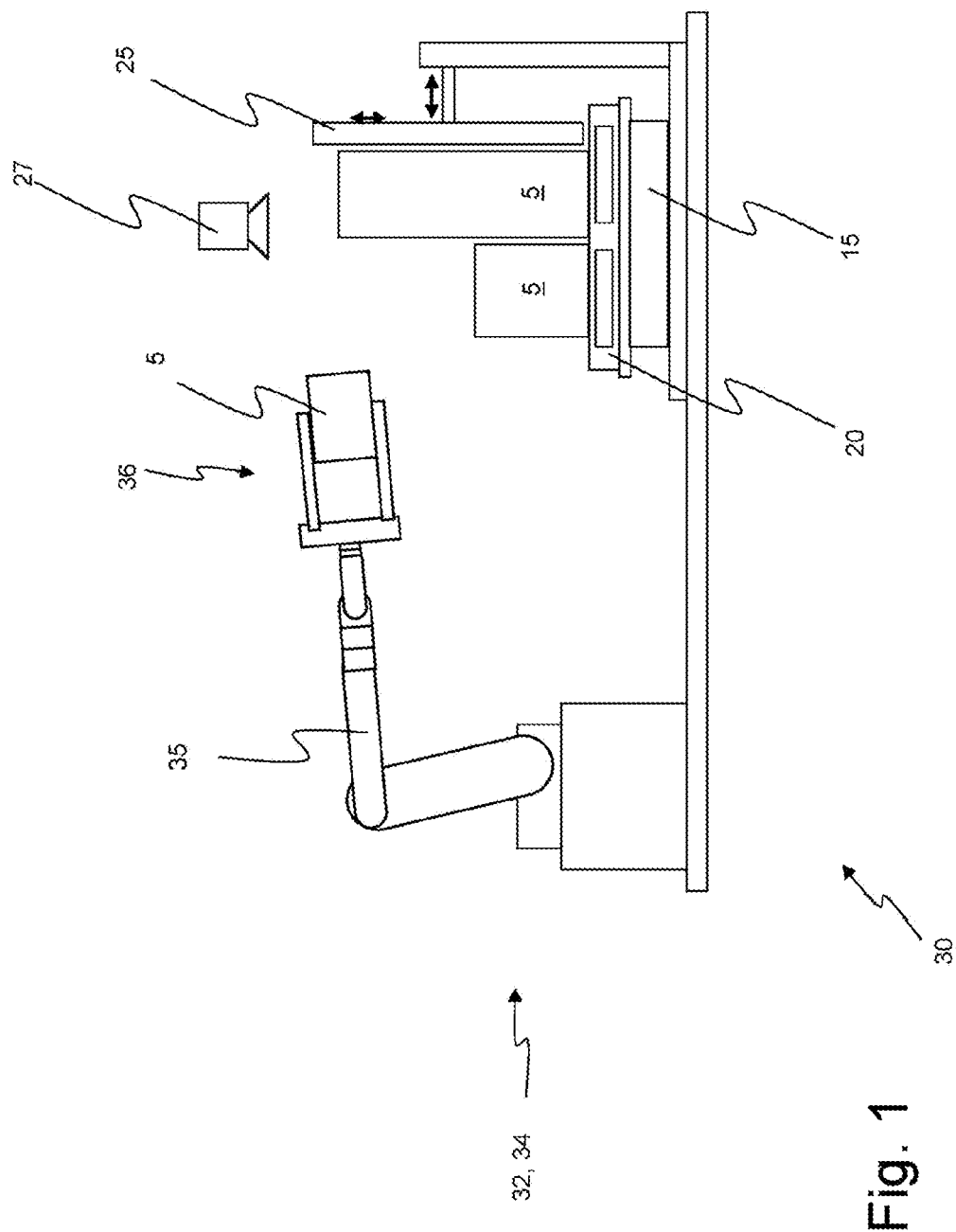
FIGS. 1 and 2 show a schematic view of a blank supply, as can be provided in various embodiments of a packaging system according to the invention and in various embodiments of a method according to the invention.

Identical reference numerals are used for identical elements of the invention or those having the same effect. Furthermore, for the sake of clarity, only reference signs are shown in the individual figures, which are required for the description of the respective figure. The illustrated embodiments are merely examples of how the invention can be designed, and are non-limiting.

DETAILED DESCRIPTION OF THE INVENTION

The embodiments, examples and variants of the preceding paragraphs, the claims or the following description and the figures, including their various views or respective individual features, may be used independently of one another or in any combination. Features described in connection with an embodiment are applicable for all embodiments provided the features are not incompatible.

If in the context of the description of the figures below reference is also generally made to "schematic" representations and views, this in no way means that the figure representations and their description are to be of subordinate importance with regard to the disclosure of the invention. A person skilled in the art is certainly able to derive sufficient information from the schematically and abstractly drawn representations that will make it easier for him to understand the invention without being confused in any way by the drawn and possibly not exactly true-to-scale proportions. The figures enable a person skilled in the art as reader to get a better understanding of the inventive idea-which has been formulated more generally and/or more abstractly in the claims and in the general part of the description-on the basis of the more specifically explained implementations of the method according to the invention and the more specifically explained mode of operation of the packaging system according to the invention and the transport device according to the invention.

Figure 2:
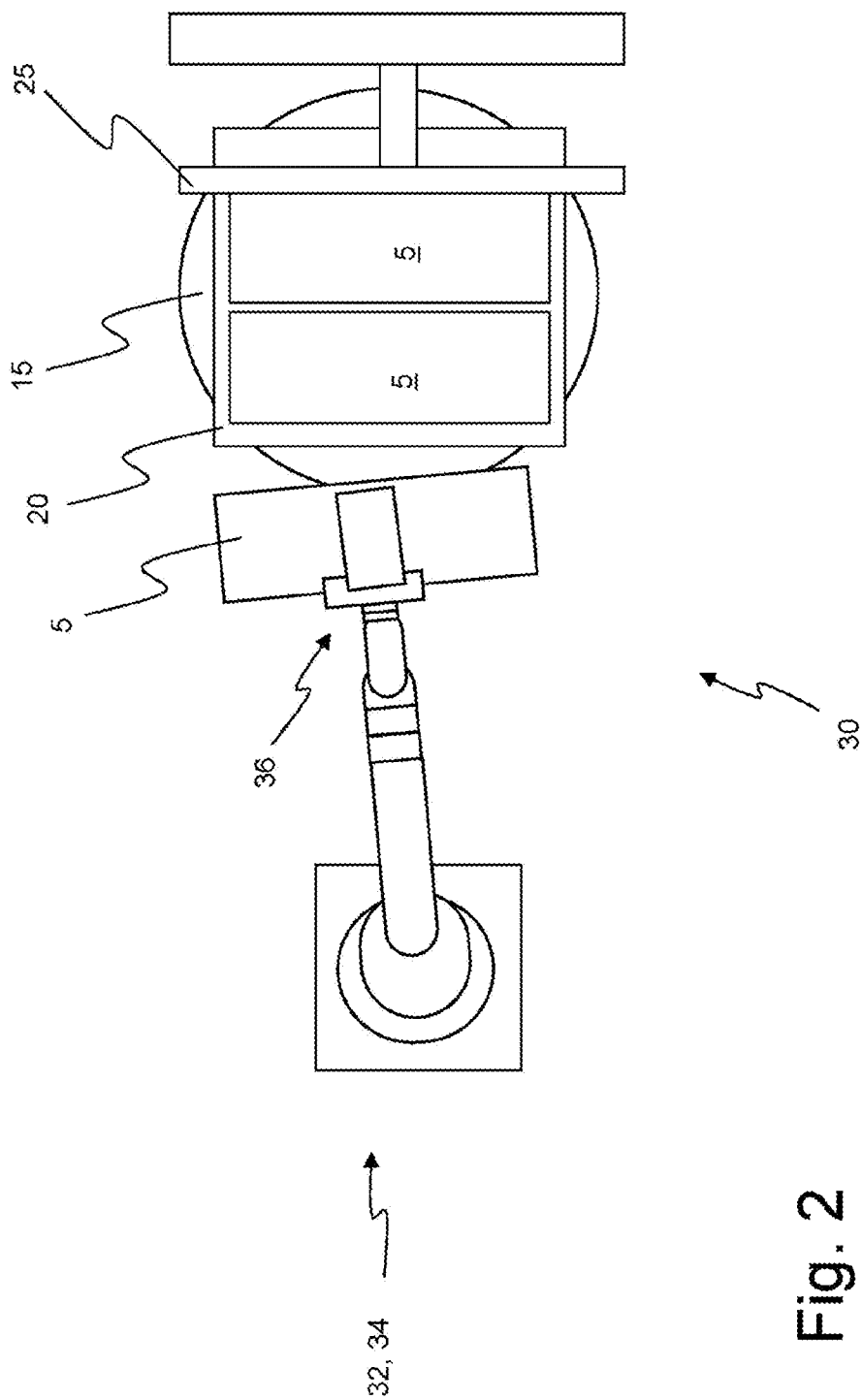

FIGS. 1 and 2 show a schematic view of a blank supply 30, as can be provided in various embodiments of a packaging system 10 according to the invention (cf. FIGS. 25 to 27) and in various embodiments of a method according to the invention. In the present case, the blank supply 30 comprises a manipulator 32, which is designed as an articulated arm robot 34 and carries a tool 36 on a working arm 35. Via the tool 36, the manipulator 32 or the articulated arm robot 34 can receive a stack of planar packaging blanks 5 from a pallet 20. In the present case, the tool 36 has two gripping fingers which can carry out a feed movement in order to grasp a corresponding stack 5 of planar packaging blanks in a clamping manner. The manipulator 32 or the articulated arm robot 34 is thus designed as a pinching gripper via its tool 36.

The tool 36 is releasably connected to the manipulator 32 or to the articulated arm robot 36. In the present case, the manipulator 32 or the articulated arm robot 34 can independently move the tool 36 into a storage device which is not shown, and can independently remove a further tool from such a storage device if necessary. A tool change can be required, for example, if different stacks of planar packaging blanks 5, which possibly have dimensions deviating from one another, are to be received by the manipulator 32 or the articulated arm robot 34.

In FIG. 1, a plurality of stacks 5 of planar packaging blanks are still arranged on a pallet 20, from which the manipulator 32 or the articulated arm robot 34 successively takes the stacks 5 of planar packaging blanks. In order for the stacks 5 of planar packaging blanks arranged on the pallet 20 to be located in each instance within a coverage range of the manipulator 32 or of the articulated arm robot 34, the blank supply 30 comprises a rotary table 15 on which the pallet 20 was set down. The rotary table 15 can rotate the pallet 20 together with the stacks 5 of planar packaging blanks arranged thereon about a vertically oriented axis, so that after the rotary movement has taken place, the manipulator 32 can grasp a corresponding stack 5 of planar packaging blanks easily, meaning without problems, with its tool 36.

In the embodiment according to FIG. 1, the tool 36 is designed to receive a stack 5 in which the planar packaging blanks each have a rectangular geometry. Since an entire stack 5 of planar packaging blanks can have a large mass, it has proven useful if the manipulator 32 or the articulated arm robot 34 grasps the stack 5 of planar packaging blanks in a clamping manner transversely or from two opposite sides of its longitudinal orientation in order to minimize a force acting on the manipulator 32 by lever effect. In embodiments with rotary tables 15, a corresponding stack 5 of planar packaging blanks can be aligned or can be rotated about a vertically oriented axis for such a reception, so that the manipulator 32 or the articulated arm robot 34 can grasp the corresponding stack 5 of planar packaging blanks in a clamping manner transversely or from two opposite sides of its longitudinal orientation.

A stack 5 comprises a plurality of planar packaging blanks which, in the embodiment according to FIGS. 1 and 2, lie on top of one another or are stacked one above the other. In practice, planar packaging blanks of a corresponding stack 5 can slip unintentionally, which can be associated with problems when the corresponding stack is received by the manipulator 32 or by the articulated arm robot 34. In order to avoid such problems, the blank supply 30 has a stop wall 25, which can be moved in the horizontal direction and thereby aligns planar packaging blanks of a corresponding stack 5 flush with one another.

If the manipulator 32 or the articulated arm robot 34 receives a stack 5 of planar packaging blanks, the manipulator 32 or the articulated arm robot 34 presses the stack 5 of planar packaging blanks against the stop wall 25 using its working tool 36. As a result, it is possible for the stack 5 of planar packaging blanks to be raised slightly, so that a fork of the working tool 36 can run under the stack 5 of planar packaging blanks.

In the embodiment according to FIGS. 1 and 2, exactly one such stop wall 25 is provided. However, it is also conceivable for at least one further stop wall to be provided, the longitudinal direction of which extends perpendicular to the stop wall shown in FIG. 25 and which is brought into contact with a further side of the planar packaging blanks in order to align flush the planar packaging blanks of a corresponding stack 5.

In practice, it has also proven useful if the stop wall 25 remains in contact with the planar packaging blanks of a corresponding stack 5, while the manipulator 32 receives the corresponding stack 5 with its tool 36. In this way, it can be avoided that planar packaging blanks of a corresponding stack 5 slip unintentionally while being received by the manipulator 32. A movement of the manipulator 32 and a horizontal movement of the stop wall 25 are thus coordinated with one another.

In FIG. 1, number 27 refers to an optical sensor, which interacts with the manipulator 32 when a corresponding stack 5 of planar packaging blanks is received. The optical sensor 27 can thus recognize a corresponding actual position of a corresponding stack 5 to be received, whereupon the manipulator 32 is actuated, taking into account the detected actual position, to correspondingly move its working tool 36. The manipulator 32 or the articulated arm robot 34 then sets down the received stack 5 of planar packaging blanks on an adapter, which is carried by a driverless transport vehicle. The driverless transport vehicle moves the adapter, together with the stack 5 of planar packaging blanks set down on the adapter, to a packaging device, whereupon the stack 5 of planar packaging blanks is introduced into the packaging device.

The position of the optical sensor 27 is to be understood in FIG. 1 merely as an example. In further embodiments, for example, the optical sensor 27 can be designed as a component of the manipulator 32 or of the articulated arm robot 35. It is conceivable here that the optical sensor 27 is arranged on the working arm 35 of the manipulator 32. For example, the optical sensor 27 can in this case be arranged in the region of the tool 36 or also on the tool 36 itself. In such embodiments, before a corresponding stack 5 of planar packaging blanks has been received, the manipulator 32 or the articulated arm robot 34 can position the optical sensor 27 by a movement of its working arm 35 in the region of the corresponding stack 5 of planar packaging blanks to be received.

A plurality of optical sensors 27 positioned in the region of the pallet 20 can also be provided. In particular, a plurality of optical sensors 27 can be positioned in the region of the pallet 20 in such a way that the corresponding three-dimensional structure of the stacks 5 of planar packaging blanks held by the corresponding pallet 20 can be detected by the plurality of optical sensors 27.

In various embodiments, alternatively to the optical sensor 27 or in addition to the optical sensor 27, further sensors, such as light barriers and/or ultrasonic sensors and/or probe sensors, can be provided in order to detect the position of a corresponding stack 5 of planar packaging blanks.

Such a manipulator 32 or multi-axis robot 34 can also be a component of a transport device 1, as described by way of example in the following FIG. 5 or, if applicable, also in the exemplary embodiment in FIGS. 13 to 17. In this case, the manipulator 32 can be fastened to the driverless transport vehicle 7 of the transport device 1 or to the adapter 3 of the transport device 1, grip stacks 5 of planar packaging blanks, which are optionally arranged on a pallet 20, and then deposit them on the corresponding adapter 3 of the corresponding driverless transport vehicle 7. In such embodiments, the manipulator 32 is moved together with a received stack 5 of planar packaging blanks in the direction of a packaging device and does not remain in the region of a corresponding pallet 20 after it has received a corresponding stack 5 of planar packaging blanks from the pallet 20 and has set it down on the adapter 3.

It is also conceivable that a multi-axis robot 32 according to the representation in FIG. 1 is provided as a component of a blank supply 30 and that a transport device 1, which can bring stacks 5 of planar packaging blanks to a packaging device, has a further such multi-axis robot 32, which is designed as a fixed component of the transport device 1 or which is carried by a driverless transport vehicle 7 of the transport device 1. In such embodiments, the multi-axis robot 32, which is designed as a component of the blank supply 30, can receive stacks 5 of planar packaging blanks from a pallet 20 and then transfer them to the further multi-axis robot, which is designed as a component of the transport device 1. The further multi-axis robot can then set down the corresponding stack 5 of planar packaging blanks on the adapter 3 of its transport device 1.

FIG. 2 again shows the rotary table 15 on which the pallet 20 was set down. An axis of rotation of the rotary table 15 extends in FIG. 2 in the direction of the image plane. The pallet 20 can be placed onto the rotary table 15 together with the stacks 5 of planar packaging blanks, for example, by a lifting carriage, by a pallet conveyor, by a stacker, or by further apparatuses.

Figure 3:
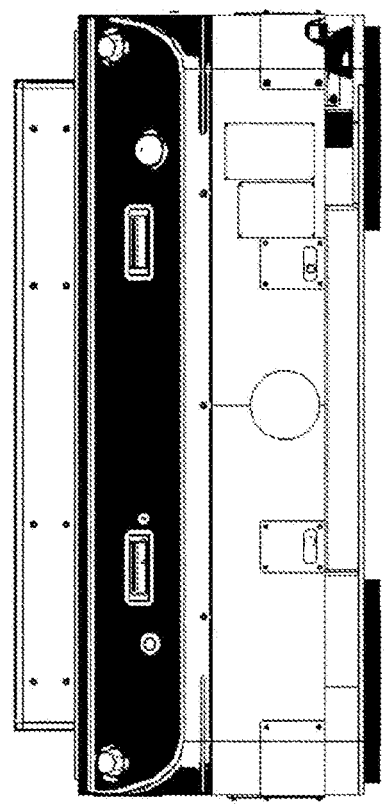
FIG. 3 shows a schematic view of an embodiment of a driverless transport vehicle, as can be provided in various embodiments of a transport device according to the invention, in various embodiments of a packaging system according to the invention and in various embodiments of a method according to the invention.

FIG. 3 shows a schematic view of an embodiment of a driverless transport vehicle 7, as can be provided in various embodiments of a transport device according to the invention, in various embodiments of a packaging system according to the invention and in various embodiments of a method according to the invention. The driverless transport vehicle, or DTV or AGV, is designed to hold an adapter and can move forward independently or autonomously. In practice, the driverless transport vehicle 7 can have a battery, which provides the electrical power required by the driverless transport vehicle 7.

It has proven useful if the driverless transport vehicle 7 is moved back and forth between a blank supply 30 (cf. FIGS. 1 and 2) and a packaging device 2 (cf. FIGS. 25 to 27) by inductive lane guidance. The driverless transport vehicle 7 can also move forward with the aid of GPS and/or laser navigation.

Figure 4:
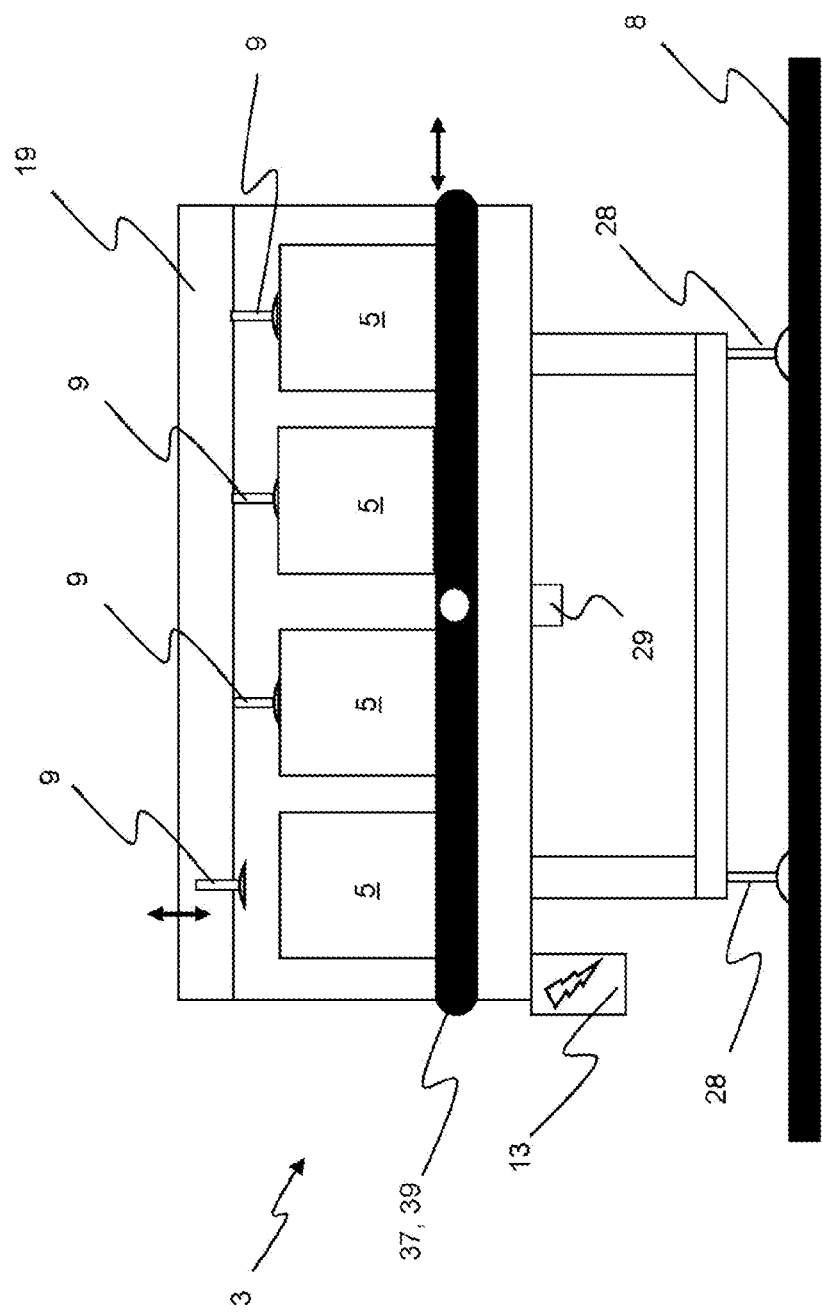
FIG. 4 shows a schematic view of an embodiment of an adapter, as can be provided in various embodiments of a transport device according to the invention and in the implementation in various embodiments of the method according to the invention.

FIG. 4 shows a schematic view of an embodiment of an adapter 3, as can be provided in various embodiments of a transport device according to the invention. The adapter 3 can be carried by a driverless transport vehicle 7 (cf. FIG. 3) and then forms a transport device 1 (cf. FIG. 5) together with the driverless transport vehicle 7, which can bring stacks 5 of planar packaging blanks from a blank supply to a packaging device.

The adapter 3 comprises a plurality of supporting legs 28, via which the adapter 3 then stands on a floor surface 8 when the adapter 3 is not carried by the driverless transport vehicle. This makes it possible for the adapter 3 to be set down, for example, in the region of a blank supply 30 (cf. FIGS. 1 and 2), and a stack 5 or a plurality of stacks 5 to be set down on the adapter 3 before a driverless transport vehicle 7 receives the adapter 3 together with the stacks 5 of planar packaging blanks already located on the adapter 3.

The adapter 3 further comprises a terminal box 13 and a plug connection 29. The driverless transport vehicle 7 has a plug that corresponds to the plug connection 29 of the adapter 3. If the adapter 3 is carried by the driverless transport vehicle 7 (cf. FIG. 3), the plug connection 29 and the corresponding plug of the driverless transport vehicle 7 form an interface via which the driverless transport vehicle 7 and the adapter 3 can exchange data and/or via which the adapter 3 is supplied with electrical power from the driverless transport vehicle 7.

Figure 25:
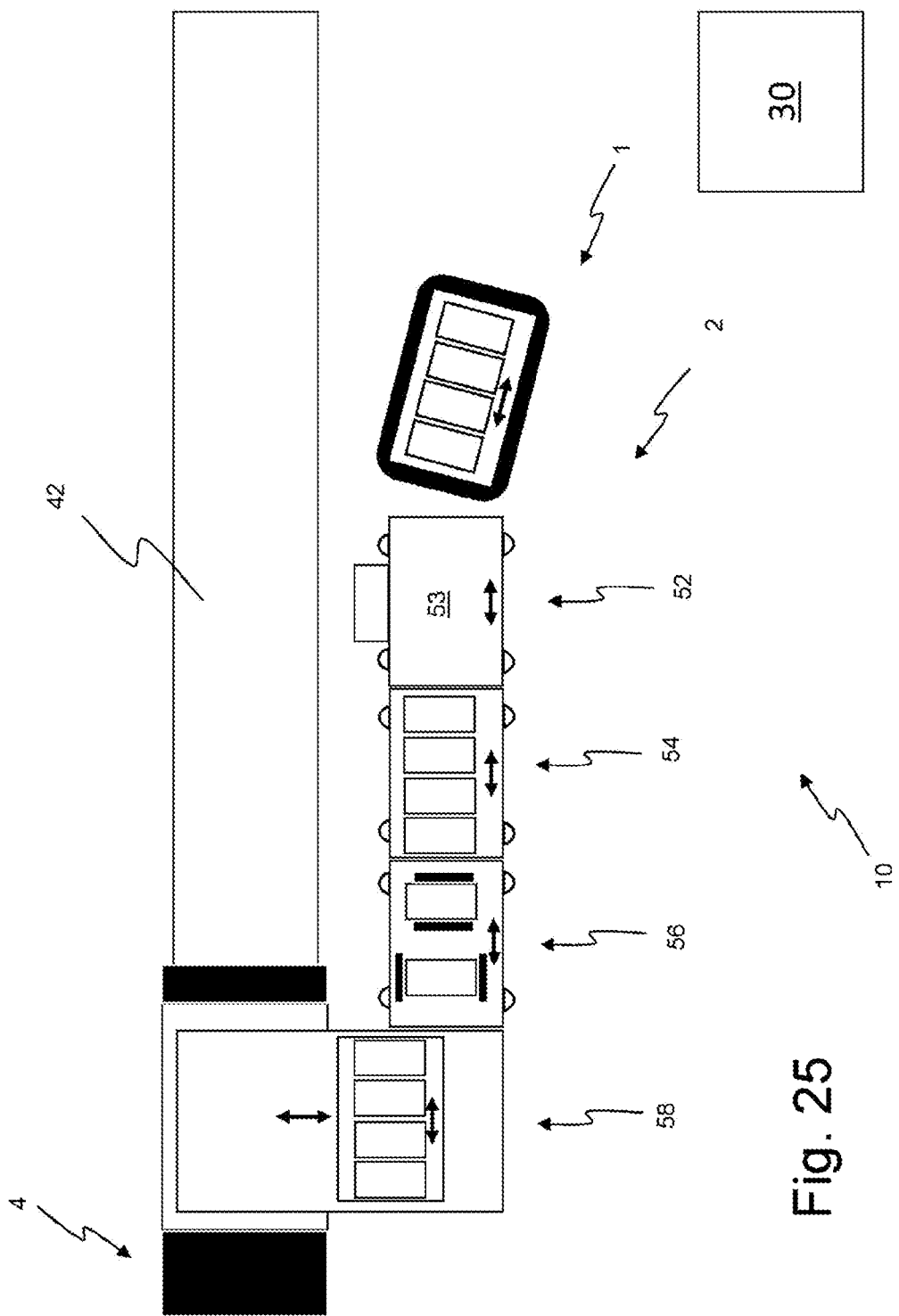
FIG. 25 shows a schematic plan view of an embodiment of a packaging system according to the invention with an embodiment of a packaging device according to the invention.
Figure 26:
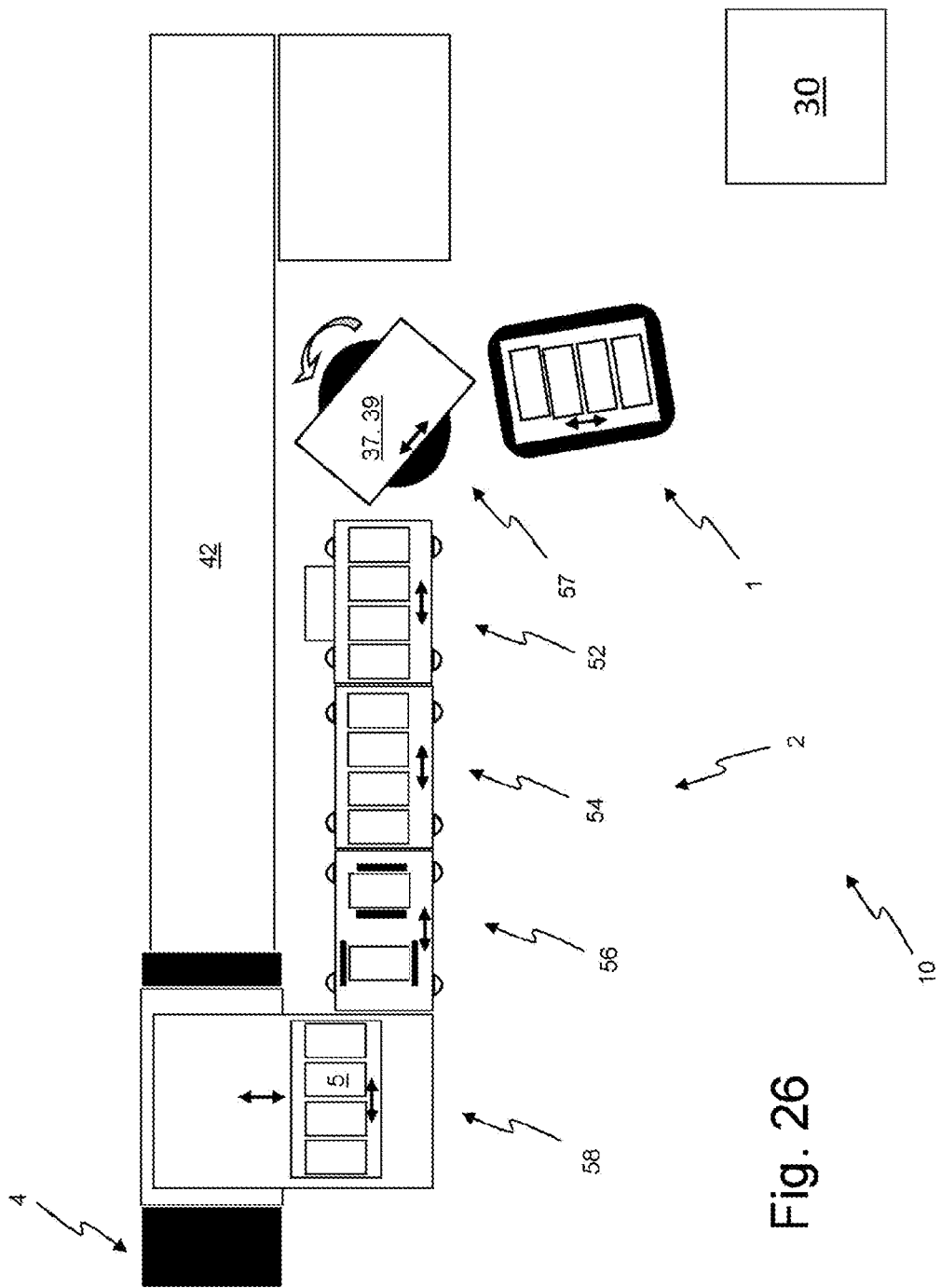
FIGS. 26 and 27 show further embodiments of a packaging system according to the invention with an embodiment of a packaging device according to the invention.
Figure 27:
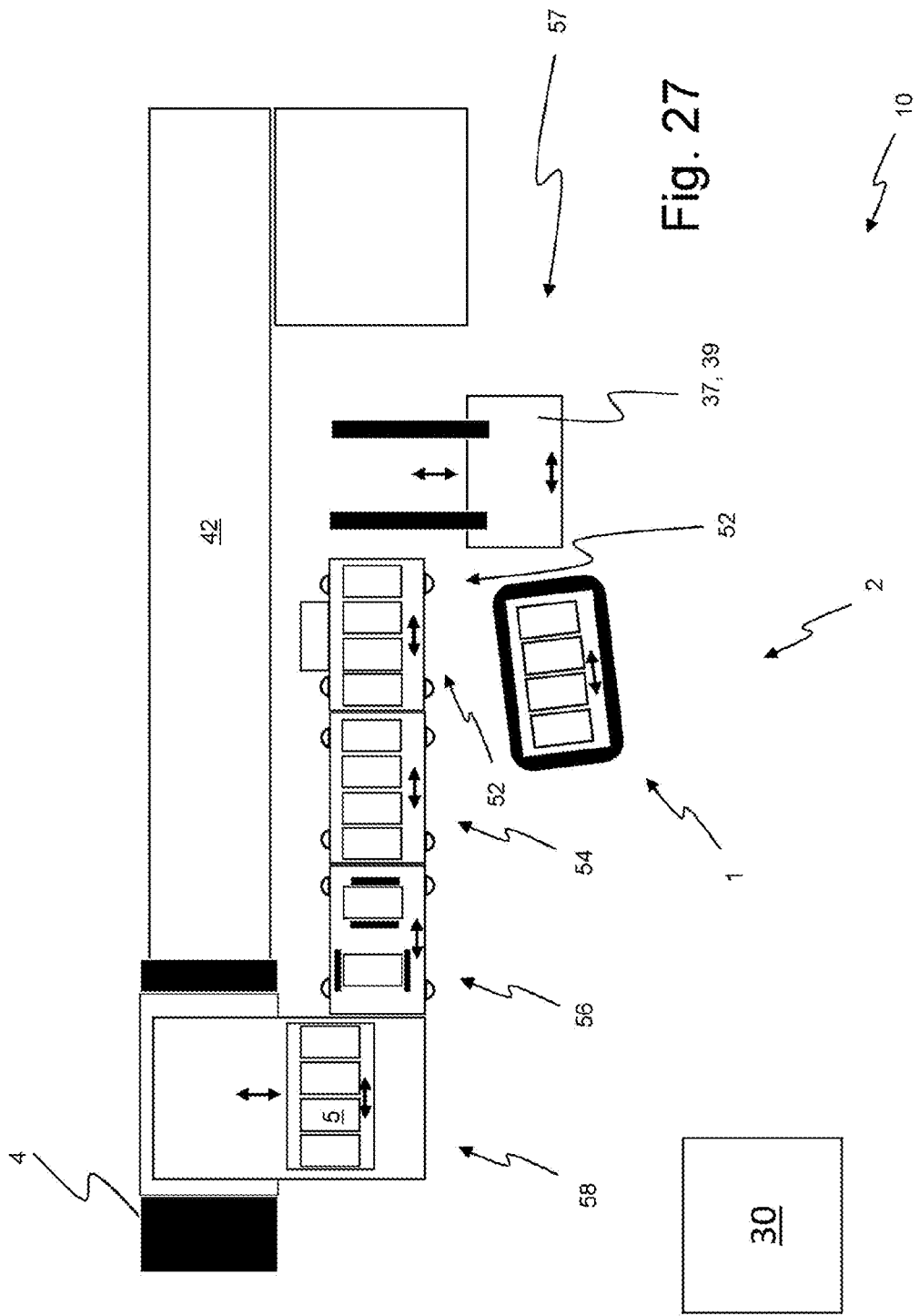

A component of the adapter 3 is also a circulatingly driven conveyor 37, which is designed as a mat belt 39 and on which the stacks 5 of planar packaging blanks stand when the driverless transport vehicle moves the adapter 3 together with the stacks 5 in the direction of a packaging device 2 (cf. FIGS. 25 to 27). The stacks 5 of planar packaging blanks can each be moved in the horizontal direction via the circulatingly driven conveyor 37 or via the mat belt 39. In this case, it has proven useful, for example, if the stacks 5 of planar packaging blanks are each moved horizontally by the circulatingly driven conveyor 37 and are thereby transferred to a packaging device.

If the adapter 3 is loaded with stacks 5 of planar packaging blanks in the region of a blank supply 30 (cf. FIGS. 1 and 2), then in a first step a first stack 5 of planar packaging blanks can be placed onto the circulatingly driven conveyor 37. The circulatingly driven conveyor 37 can then move this already placed stack 5 of planar packaging blanks in the horizontal direction, whereupon a further stack 5 of planar packaging blanks is placed into the corresponding position on the circulatingly driven conveyor 37.

If the adapter 3 is carried by a driverless transport vehicle 7 (cf. FIG. 3) and moved together with held stacks 5 of planar packaging blanks in the direction of a packaging device, it cannot be ruled out with certainty that the stacks 5 of planar packaging blanks 5 do not unintentionally tip or that individual planar packaging blanks of a corresponding stack 5 lose their flush alignment during transport. In order to avoid such problems, the adapter 3 comprises a fixing apparatus with a plurality of punches 9 which are fastened to a rack 19.

A respective punch 9 can in this case be placed in a force-loaded manner coming from above onto a corresponding stack 5 of planar packaging blanks and fix the corresponding stack 5 of planar packaging blanks in a clamping manner on the circulatingly driven conveyor 37. If the stacks 5 of planar packaging blanks have been transported via the driverless transport vehicle 7 to the packaging device and are to be transferred to the packaging device in a subsequent step, the punches 9 are again moved in the upward direction, as a result of which the punches 9 lose their corresponding contact with a packaging blank arranged on top of a corresponding stack 5 and the corresponding stack 5 is no longer fixed in place.

Figure 5:
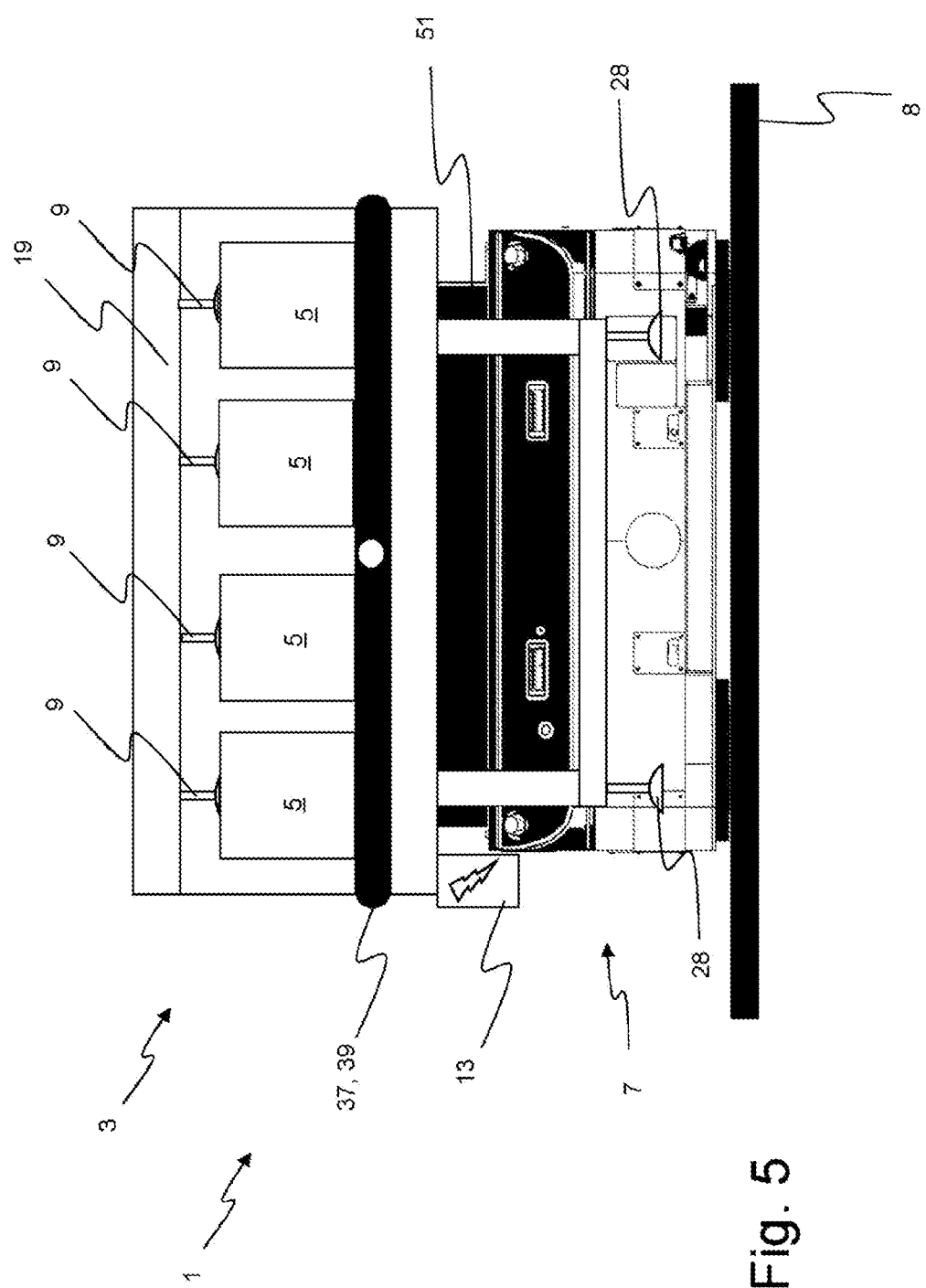
FIG. 5 shows a schematic view of an embodiment of a transport device.

FIG. 5 shows a schematic view of an embodiment of a transport device 1. The transport device 1 comprises a driverless transport vehicle 7 and an adapter 3, which has already been received by the driverless transport vehicle 7 in FIG. 5 and is carried by the driverless transport vehicle 7. The adapter 3 has also continued to hold a plurality of stacks 5 of planar packaging blanks. According to the previous description relating to FIG. 4, the stacks 5 of planar packaging blanks are fixed by the punches 9 in a clamping manner on the circulatingly driven conveyor 37 or on the mat belt 9.

To receive the adapter 3, the driverless transport vehicle 7 drives under the adapter 3, whereupon the driverless transport vehicle 7 lifts the adapter 3 in the vertical direction until the supporting feet 28 of the adapter 3 lose their contact with the floor surface 8 and are located in the position according to FIG. 5. Subsequently, the driverless transport vehicle 7 can move the adapter 3, together with the stacks 5 of planar packaging blanks held by the adapter 3, in the direction of a packaging device. For lifting the adapter 3, the driverless transport vehicle 7 comprises a lifting mechanism 51.

Figure 6:
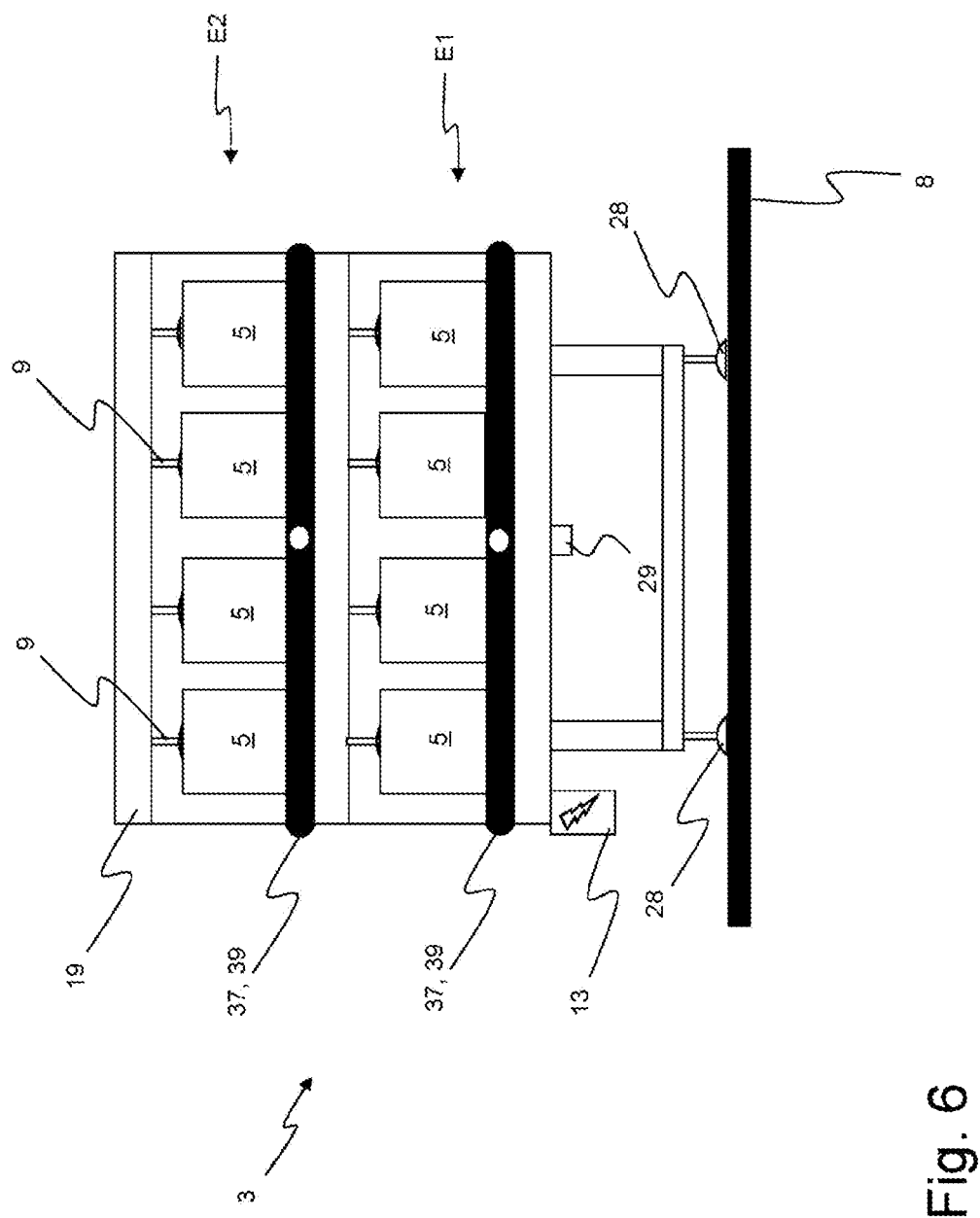
FIG. 6 shows a schematic view of a further embodiment of an adapter, as can be provided as a component in various embodiments of a transport device according to the invention and in the implementation in various embodiments of the method according to the invention.

FIG. 6 shows a schematic view of a further embodiment of an adapter 3, as can be provided as a component in various embodiments of a transport device 1 according to the invention. The embodiment of an adapter 3 from FIG. 6 also comprises a plug connection 29 corresponding to the embodiment according to FIG. 4, a terminal box 13 and a plurality of supporting legs 28, with which the adapter 3 stands on a floor surface 8, provided that the driverless transport vehicle 7 is not carrying the adapter 3.

Compared to the embodiment of an adapter 3 according to FIG. 4, the adapter 3 of the embodiment according to FIG. 6 differs in that the adapter 3 can hold stacks 5 of planar packaging blanks in a plurality of planes E1 and E2, which are offset relative to one another in the vertical direction. For each of the planes E1 and E2, a circulatingly driven conveyor 37 is also provided, which is designed as a mat belt 39. The stacks 5 of planar packaging blanks can each be moved in the horizontal direction by the respective circulatingly driven conveyor 37. The embodiment of the adapter 3 shown here with exactly two planes E1 and E2, via each of which stacks 5 of planar packaging blanks can be held, is to be understood merely as an example. Thus, in various further embodiments, it is also conceivable for the adapter 3 to provide more than two planes E1 and E2, via which such an adapter 3 can in each instance receive stacks 5 of planar packaging blanks.

Figure 7:
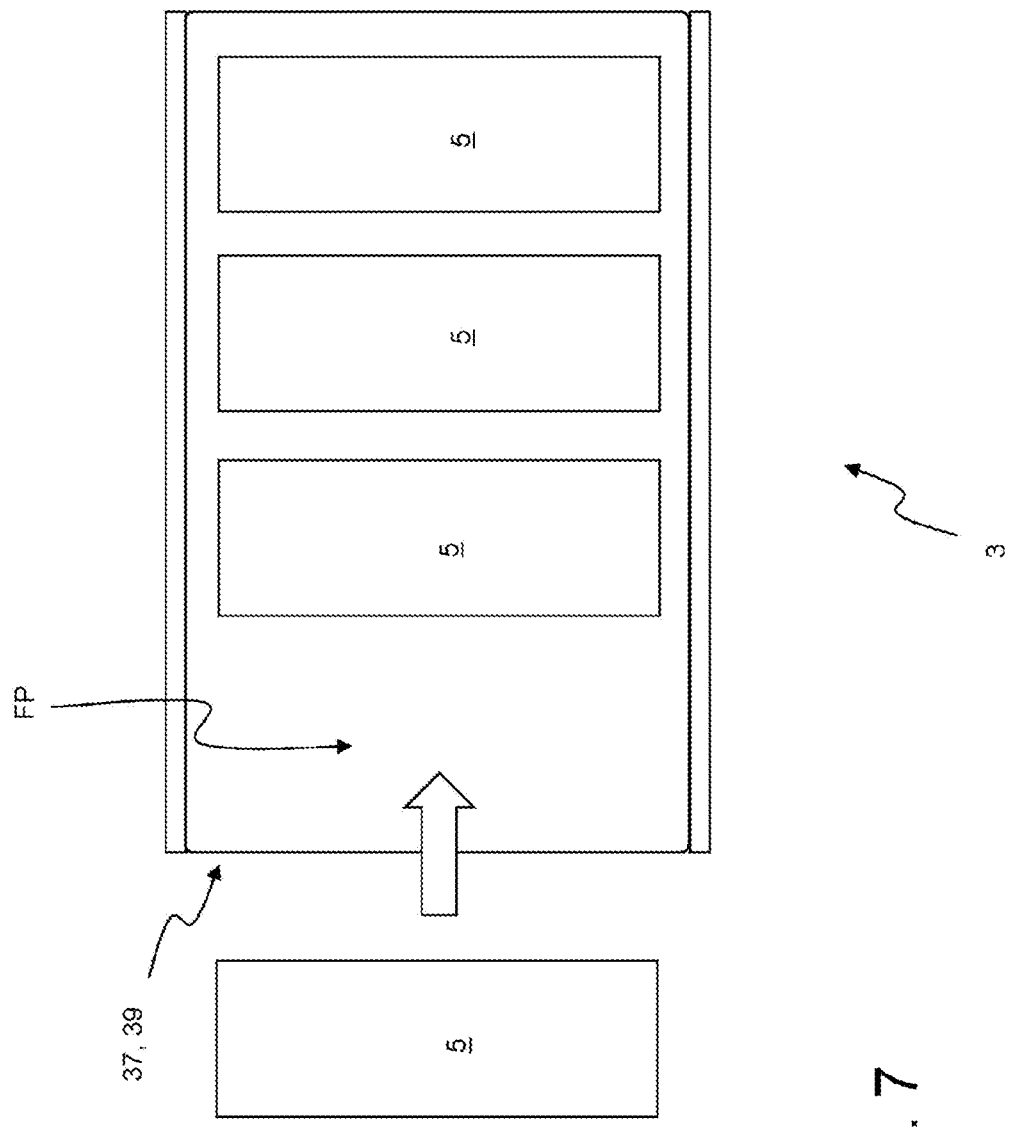
FIGS. 7 and 8 each show a schematic plan view of embodiments of an adapter, as can be provided for various embodiments of a transport device according to the invention and in the implementation in various embodiments of the method according to the invention.
Figure 8:
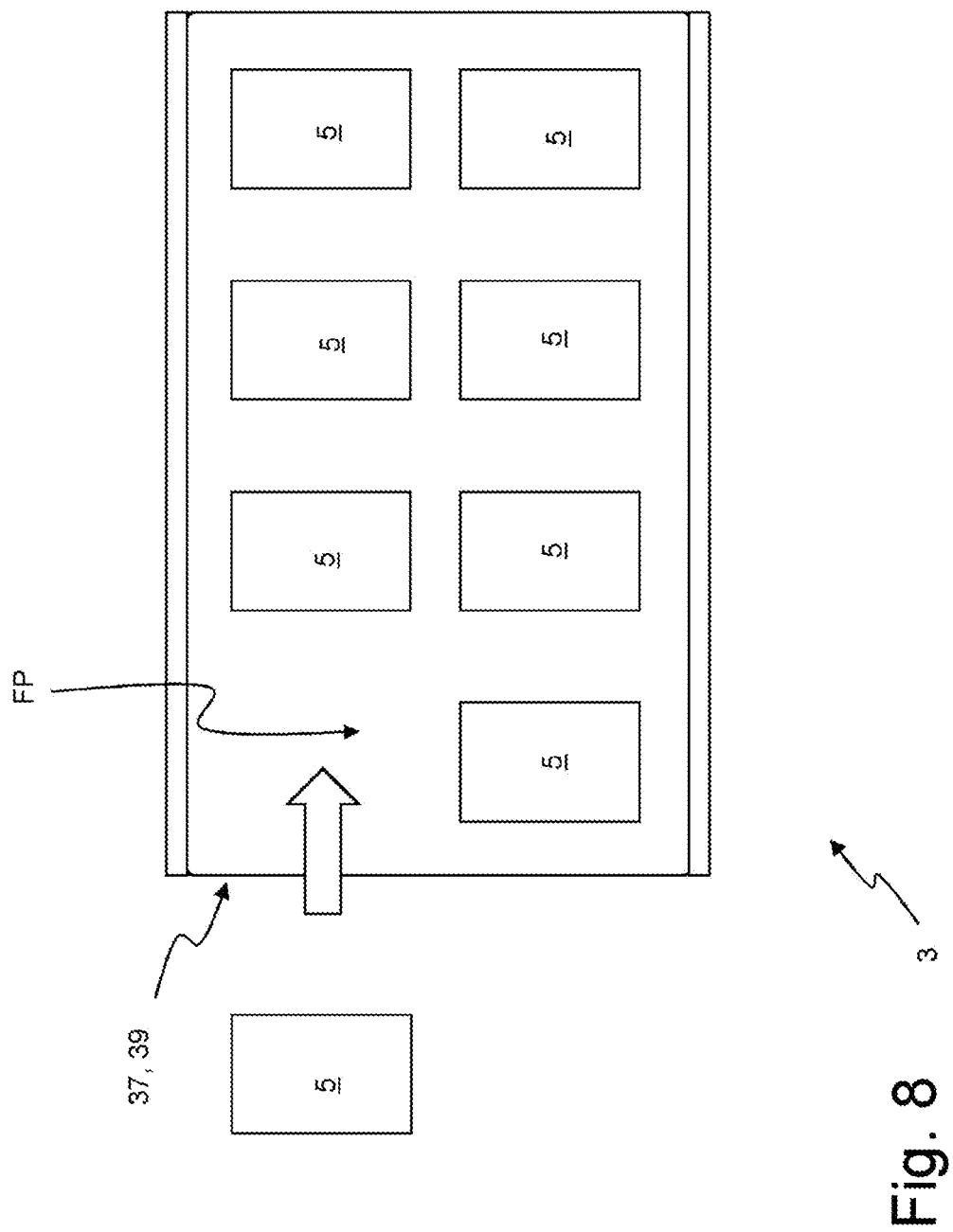

FIGS. 7 and 8 each show a schematic plan view of embodiments of an adapter 3, as can be provided for various embodiments of a transport device 1 according to the invention. The adapter 3 according to the embodiment according to FIG. 7 in turn comprises a circulatingly driven conveyor 37, which is designed as a mat belt 39. A transport direction is indicated in FIG. 7 as represented by the arrow, along which transport direction the circulatingly driven conveyor 37 or the mat belt 39 can move stacks 5 of planar packaging blanks already held by the adapter 3.

In FIG. 7, the three stacks 5 of planar packaging blanks already set down on the circulatingly driven conveyor 37 were moved along this transport direction. As a result, a free position FP arises on the circulatingly driven conveyor 37, at which position FP the stack 5 of planar packaging blanks, which is not yet set down on the circulatingly driven conveyor 37 in FIG. 7, is subsequently arranged.

Setting down stacks 5 of planar packaging blanks on the circulatingly driven conveyor 37 can furthermore take place by a manipulator 32 of a blank supply 30, as already shown and described in FIGS. 1 and 2. In this case, the manipulator 32 sets down stacks 5 of planar packaging blanks on the circulatingly driven conveyor 37. The circulatingly driven conveyor 37 can be operated intermittently in coordination with the cycle of the manipulator 32, so that a certain distance in the direction of the arrow between the stacks 5 of planar packaging blanks is formed after all stacks 5 of packaging blanks are completely held.

The adapter 3 of the exemplary embodiment according to FIG. 8 also comprises a circulatingly driven conveyor 37, which is designed as a mat belt 39. Compared to the exemplary embodiment according to FIG. 7, the planar packaging blanks of a corresponding stack 5 have a smaller dimensioning. In the embodiment according to FIG. 8, in each instance two stacks 5 of planar packaging blanks can therefore be held via the adapter 3 perpendicular to the transport direction of the circulatingly driven conveyor 37 indicated by arrow representation in FIG. 8.

Figure 9:
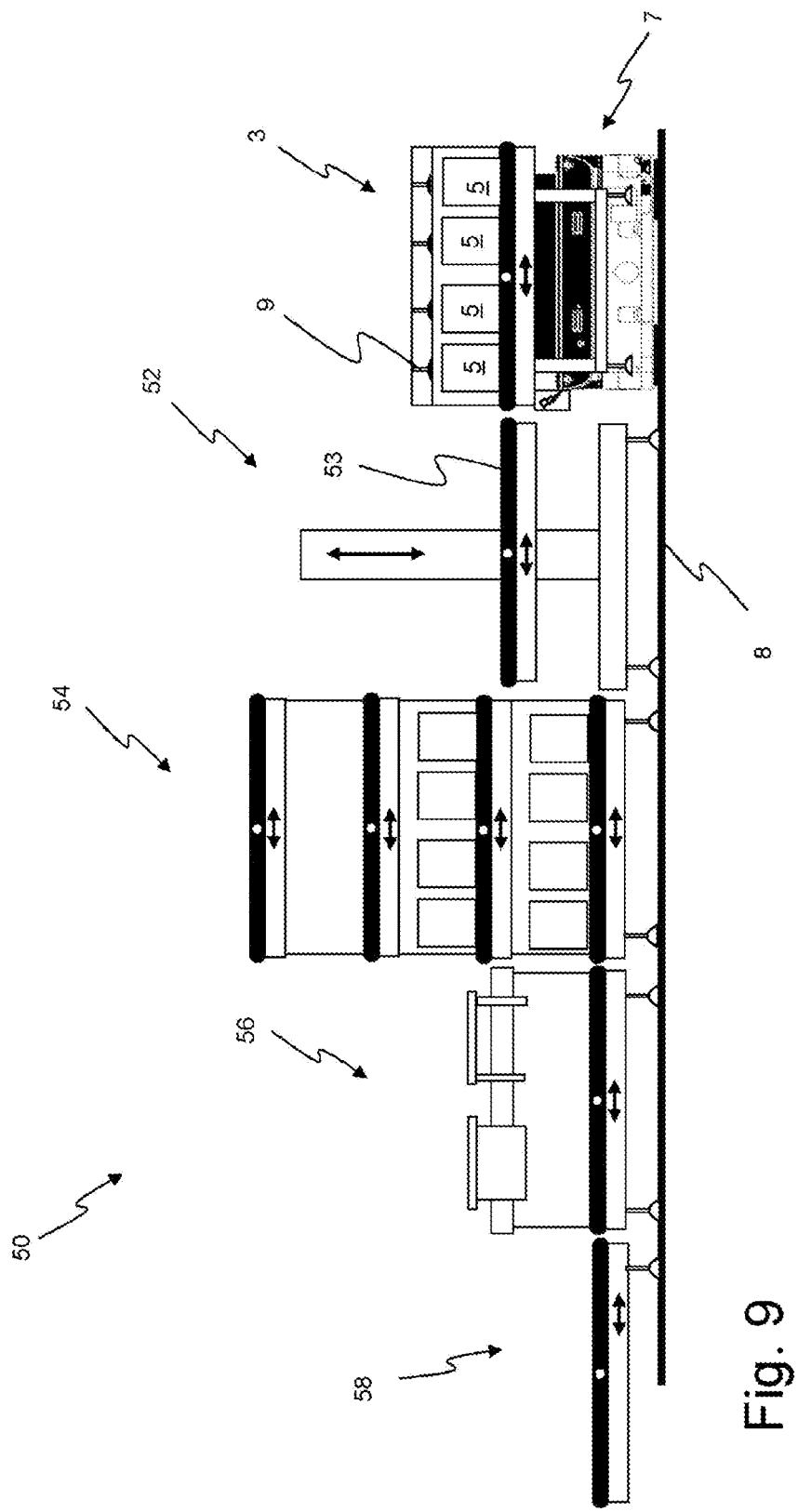
FIGS. 9 to 12 show individual details and aspects as can be provided in various embodiments of a packaging system according to the invention and in various embodiments of the method according to the invention when it is performed.

FIGS. 9 to 12 show individual details and aspects as can be provided in various embodiments of a packaging system according to the invention and in various embodiments of the method according to the invention when it is performed. FIG. 9 shows a transfer module 50, which is designed as a component of a packaging device, which is not completely shown in FIG. 9. However, the complete packaging device 2 is shown together with such a transfer module 50 in FIGS. 25 to 27.

Together with the carried adapter 3 and the stacks 5 of planar packaging blanks held via the adapter 3, the driverless transport vehicle 7 moves independently into a region close to the transfer module 50 and is then located according to FIG. 9 in a position from which the adapter 3 can transfer its held stacks 5 of planar packaging blanks to the stack elevator 52 of the transfer module 50. The stack elevator 52 has a platform 53. The platform 53 can be raised in the vertical direction and lowered in the vertical direction. To receive the stacks 5 of planar packaging blanks, the platform 53 is brought to a vertical height level which corresponds to the vertical height level of the circulatingly driven conveyor 37, on which the stacks 5 of planar packaging blanks, which are still held by the adapter 3 until then, stand. In FIG. 9, the punches 9 of the adapter have already been moved in the upward direction, so that the stacks 5 of planar packaging blanks are released or are no longer fixed in place by the punches 9.

Figure 10:
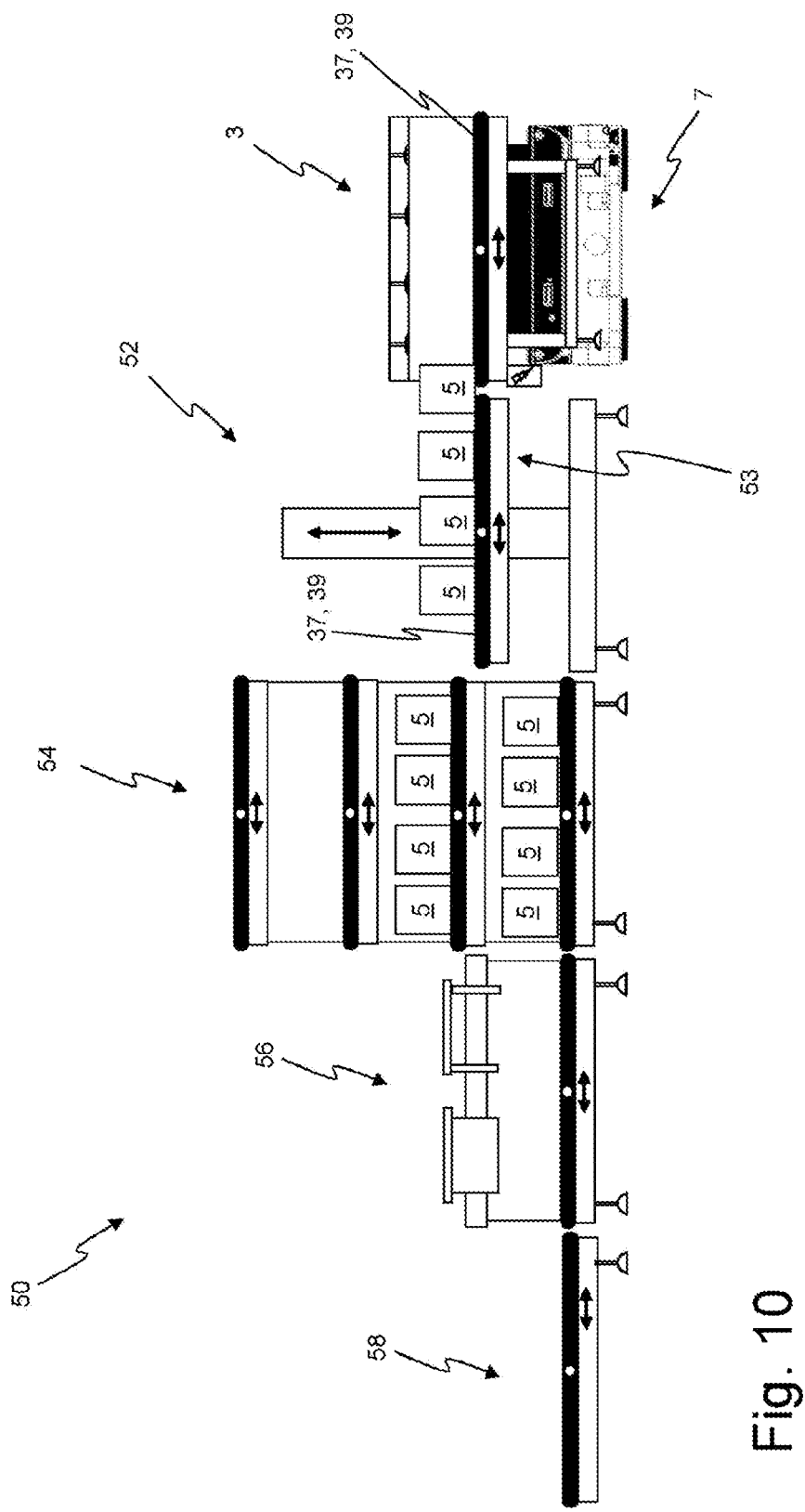

The further procedure for holding the stacks 5 of planar packaging blanks via the transfer module 50 results from a combination of FIGS. 9 and 10. While the stacks 5 of planar packaging blanks are still completely held by the adapter 3 in FIG. 9, the stacks 5 of planar packaging blanks have almost completely switched to the stack elevator 52 of the transfer module 50 in FIG. 10 or have already been received almost completely by the stack elevator 52 of the transfer module 50. Both the platform 53 of the stack elevator 52 and the adapter 3 of the transport device 1 have a circulatingly driven conveyor 37, which is designed as a mat belt 39. When the stacks 5 of planar packaging blanks are transferred from the adapter 3 to the platform 53, the circulatingly driven conveyor 37 of the platform 53 and the circulatingly driven conveyor 37 of the adapter 3 are driven simultaneously and with at least approximately the same transport speed, so that the stacks 5 of planar packaging blanks retain their relative distance to one another when they are switched from the adapter 3 to the platform 53.

Figure 11:
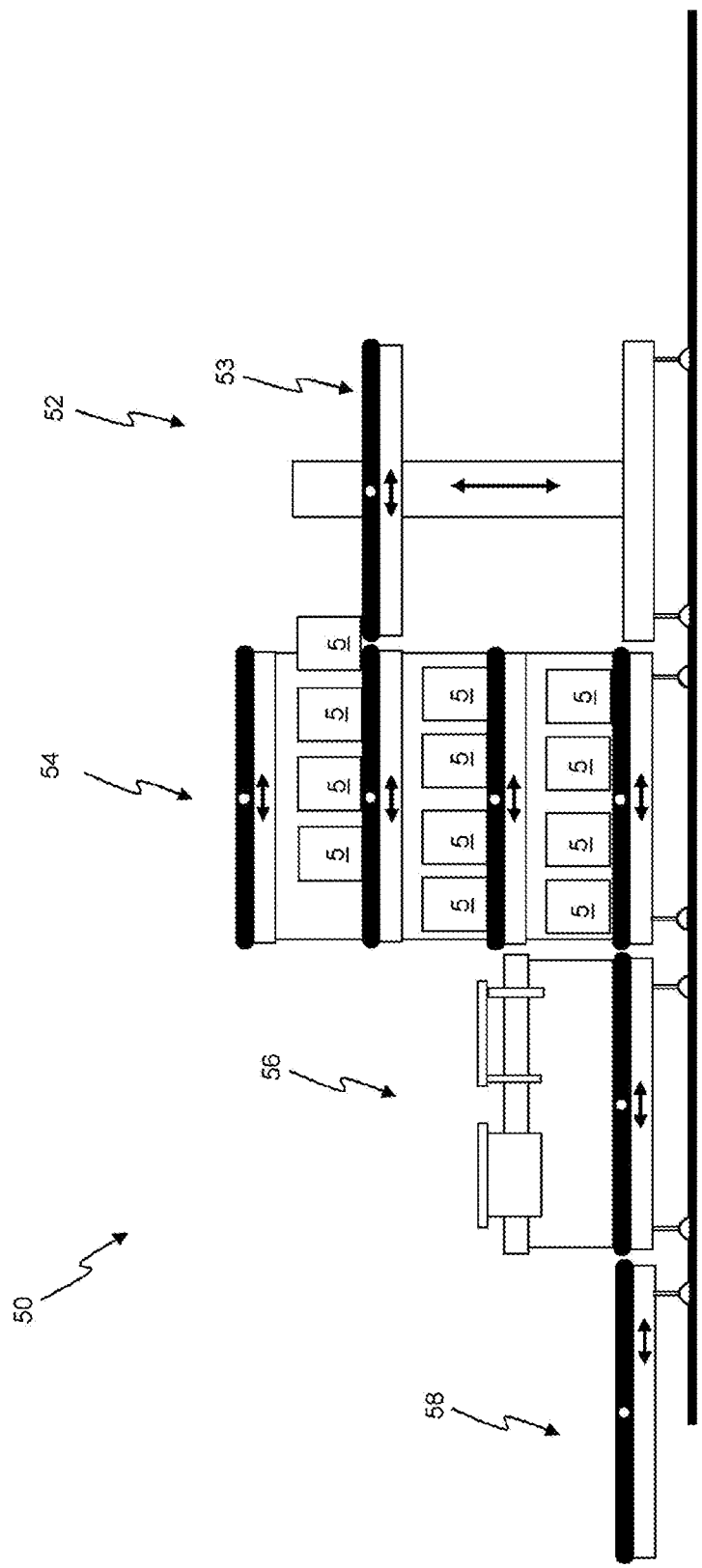

In time after all stacks 5 of planar packaging blanks held by the adapter 3 have been transferred onto the stack elevator 52, the platform 53 is raised in the vertical direction or lowered in the vertical direction as required until the platform 53 reaches a free receptacle of a stack buffer 54, into which the stack elevator 52 can introduce the stacks 5 of planar packaging blanks. Such a movement is illustrated by a combination of FIGS. 10 and 11. In FIG. 11, the stack elevator 52 or the platform 53 designed as a component of the stack elevator 52 has almost completely introduced its plurality of stacks 5 of planar packaging blanks held until then into an upper free receptacle of the stack buffer 54. The stacks 5 can be stored by the stack buffer 54 until the stacks 5 of planar packaging blanks are required for packaging article arrangements via a packaging module not shown in FIG. 11.

Figure 12:
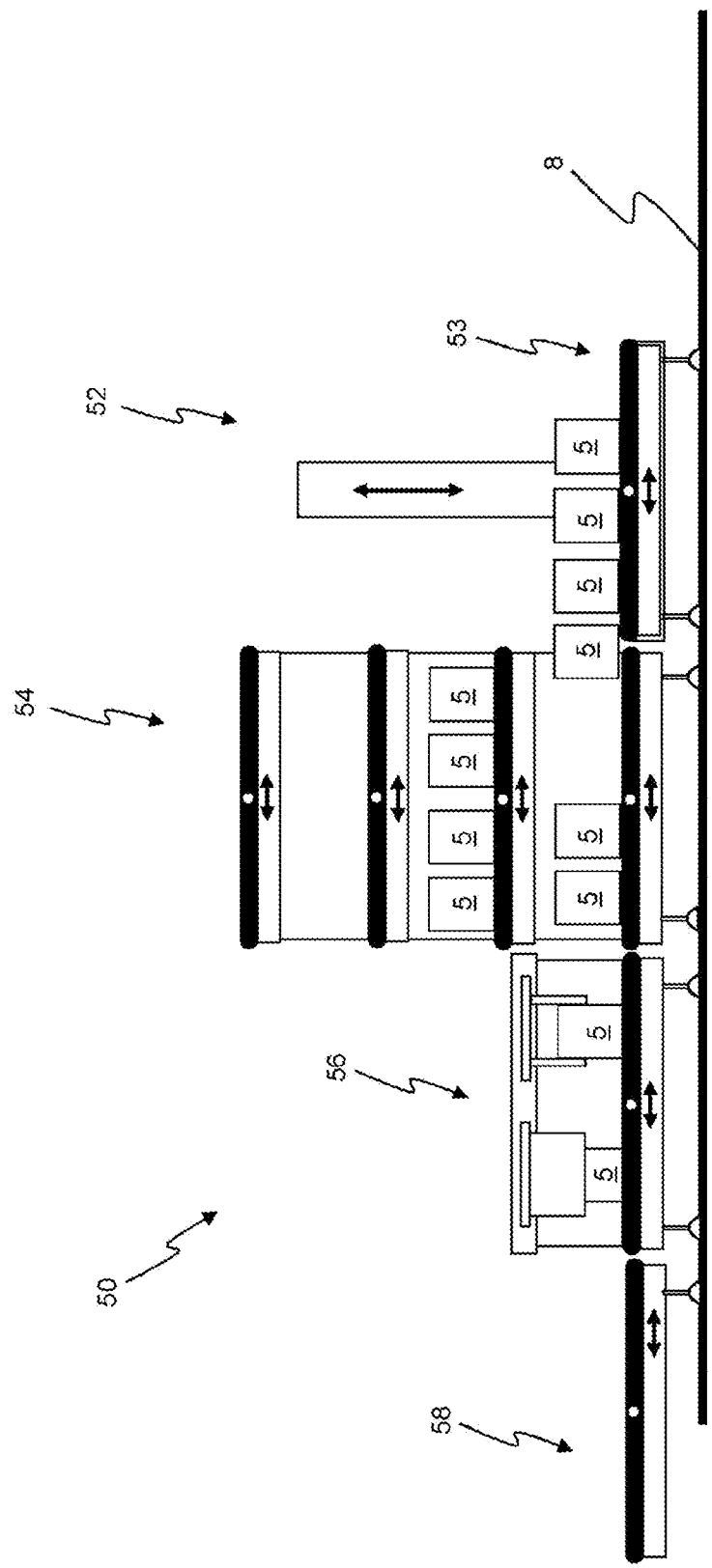

If a stock of planar packaging blanks of a packaging module is exhausted or at least approximately exhausted, the stack buffer 54 releases a plurality of stacks 5 of planar packaging blanks for supplying the packaging module. FIG. 12 thereby shows that the platform 53 of the stack elevator 54 has once again received a stack 5 of planar packaging blanks previously stored in an upper receptacle of the stack buffer 54 and has been lowered in the vertical direction together with the received stacks 5.

The stacks 5 still arranged predominantly on the platform 53 in FIG. 12 are then introduced into a lower receptacle of the stack buffer 54. At the same time, the stacks 5 of planar packaging blanks arranged until then in the lower receptacle are moved via the stack buffer 54 from the lower receptacle in the direction of a stack centering device 56, which is designed to align planar packaging blanks of a corresponding stack 5 flush with one another. After the flush alignment, the stack centering device 56 transfers the stacks 5 of planar packaging blanks to a transport belt 58 or to a further transport apparatus, which feeds the stacks 5 of planar packaging blanks received from the stack centering device 56 to a packaging module. The packaging module is used to pack article arrangements with a corresponding planar packaging blank, which was previously removed from a corresponding stack 5 for this purpose.

Figure 13:
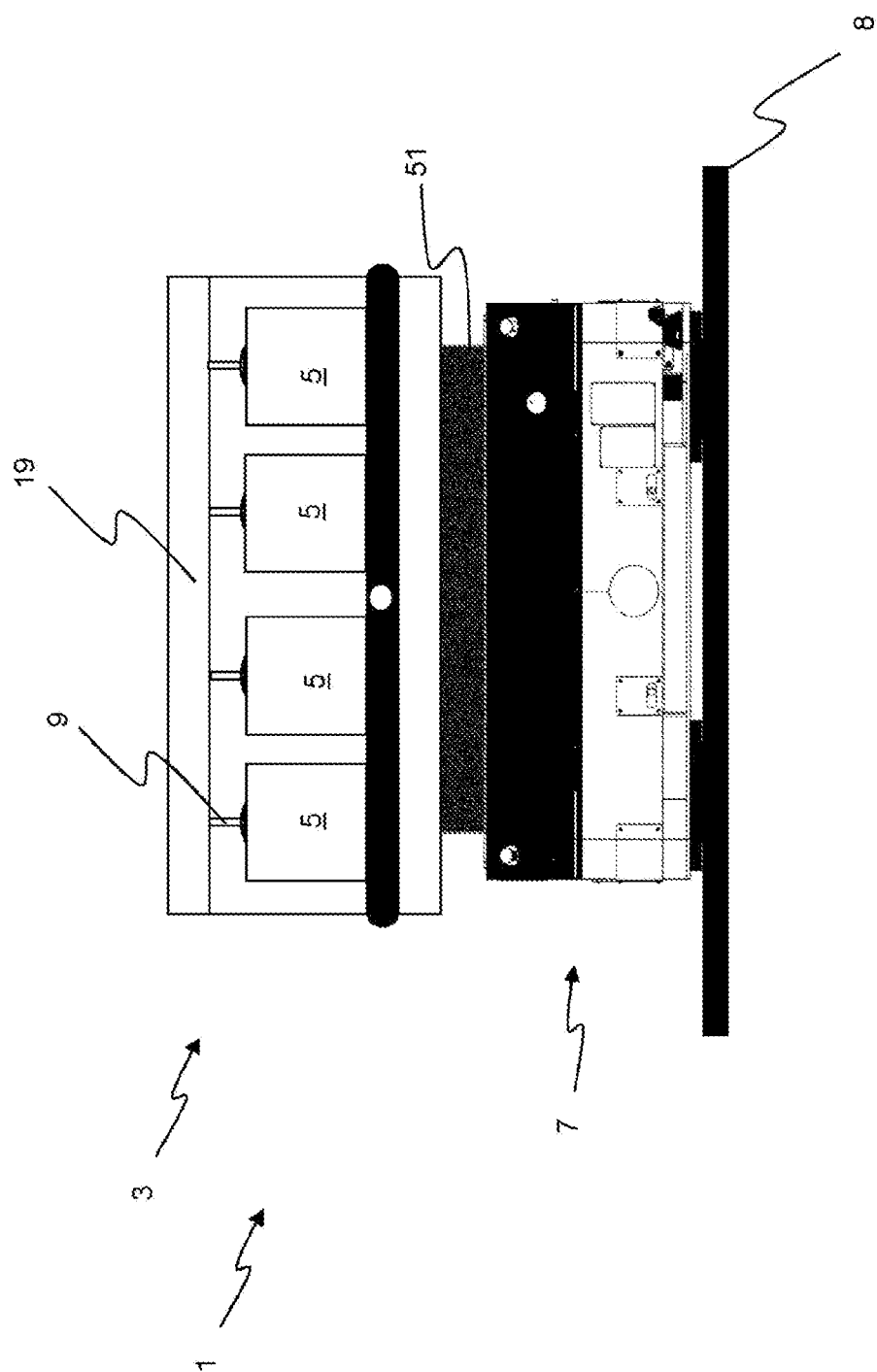
FIGS. 13 to 17 show schematic views of further embodiments of a transport device according to the invention.
Figure 14:
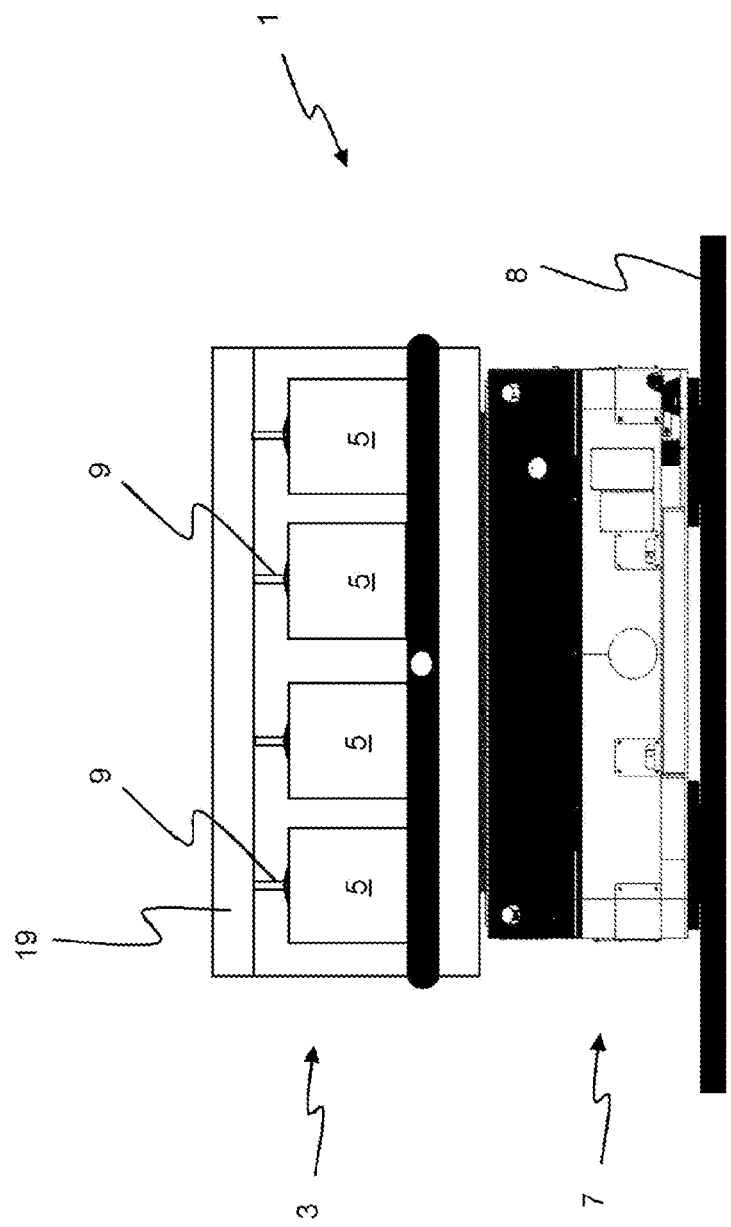

FIG. 13 shows a further embodiment of a transport device 1 according to the invention. The transport device 1 still comprises a driverless transport vehicle 7 and an adapter 3, which is carried by the driverless transport vehicle 7. Compared to the embodiment of an adapter 3 according to FIG. 4, the adapter 3 according to FIG. 13 does not have any supporting feet 28. The driverless transport vehicle 7 comprises a lifting mechanism 51, via which the adapter 3 can be raised in the vertical direction or lowered in the vertical direction. Since the adapter 3 in FIG. 13 does not comprise any supporting feet 28 and is thus not positionable on a floor surface, the adapter 3, in embodiments according to FIG. 13, can be placed on a rack by a vertical lifting movement brought about by the lifting mechanism 51 and placed in a load-bearing manner on the driverless transport vehicle 7 by a vertical lowering movement brought about by the lifting mechanism 51. Such a lifting or lowering movement becomes clear from a combination of FIGS. 13 and 14. FIG. 14 shows the embodiment of the transport device 1 according to FIG. 13, wherein the adapter 3 in FIG. 14 has already been lowered by the lifting mechanism 51.

Figure 15:
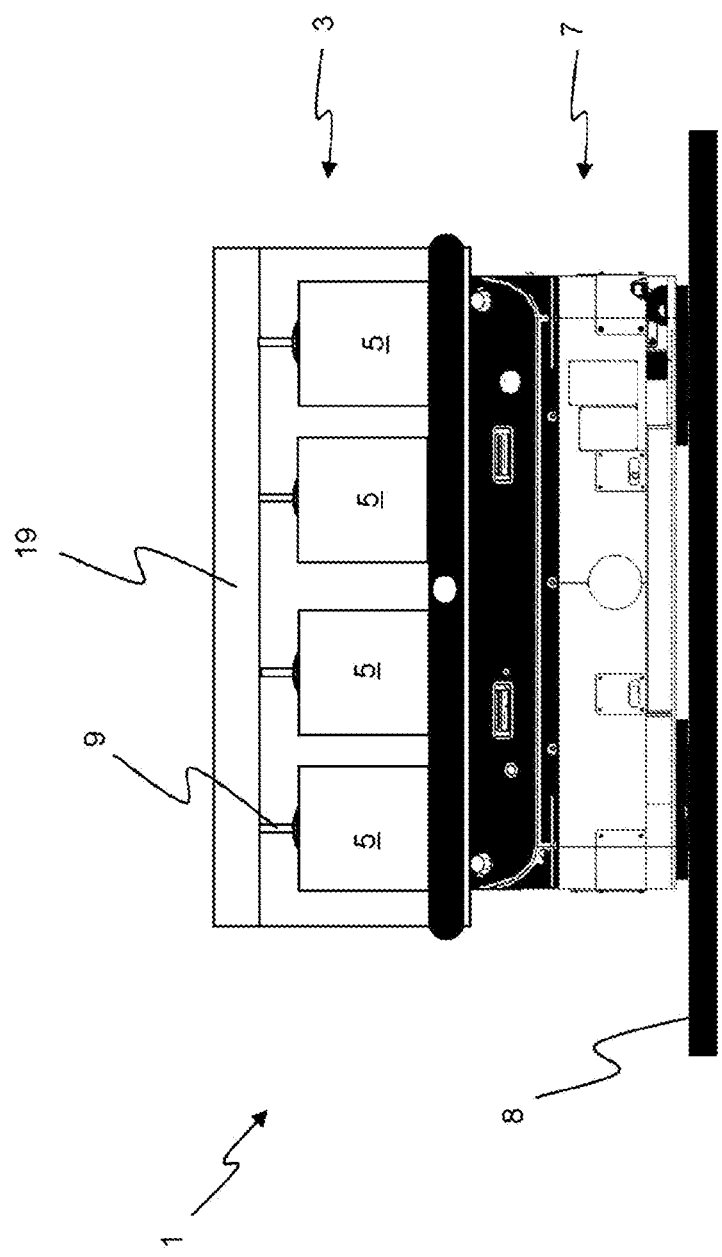

FIG. 15 shows a schematic view of a further embodiment of a transport device 1 according to the invention. The transport device 1 from the exemplary embodiment according to FIG. 15 also comprises a driverless transport vehicle 7 and an adapter 3, which is carried by the driverless transport vehicle 7. The driverless transport vehicle 7 of the embodiment according to FIG. 15 has no lifting mechanism 51, as is provided in the embodiment according to FIG. 14. In embodiments according to FIG. 15, the adapter 3 is received by an external lifting unit and mounted on a rack if the adapter 3 is not required.

Figure 16:
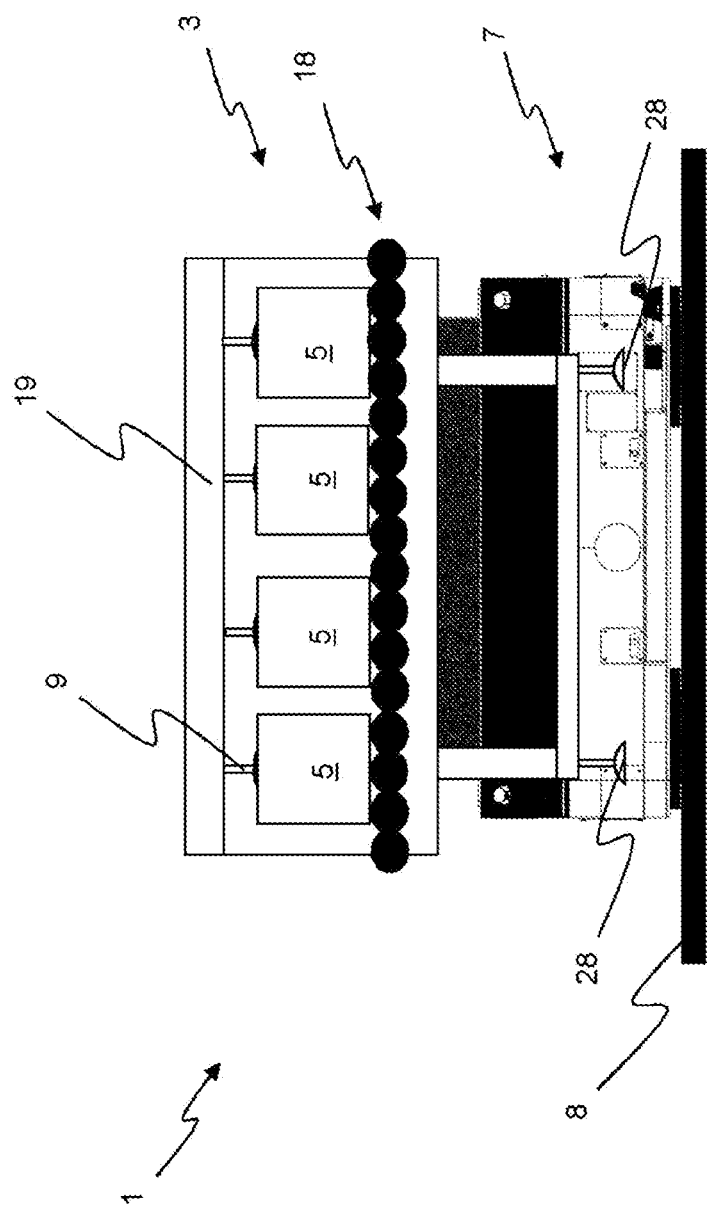

FIG. 16 shows a schematic view of a further embodiment of a transport device 1 according to the invention. The transport device 1 from the exemplary embodiment according to FIG. 16 also comprises a driverless transport vehicle 7 and an adapter 3, which is carried by the driverless transport vehicle 7. In the embodiment according to FIG. 16, the adapter 3 has a roller track 18, on which the stacks 5 of planar packaging blanks stand. If the stacks 5 of planar packaging blanks are to continue to be guided from the adapter 3 to a transfer module 50, each of the stacks 5 of packaging blanks are moved for this purpose by the roller track 18 in the horizontal direction. A platform 53, as is designed as a component of a transfer module 50 corresponding to FIGS. 9 to 12, can also have a roller track 18 instead of the continuously driven conveyor 37. In the embodiment of a transport device 1 according to FIG. 16, the stacks 5 of planar packaging blanks are furthermore fixed by a plurality of punches 9 in a clamping manner on the roller track 18. The punches 9 are each held movably in the vertical direction on a rack 19.

Figure 17:
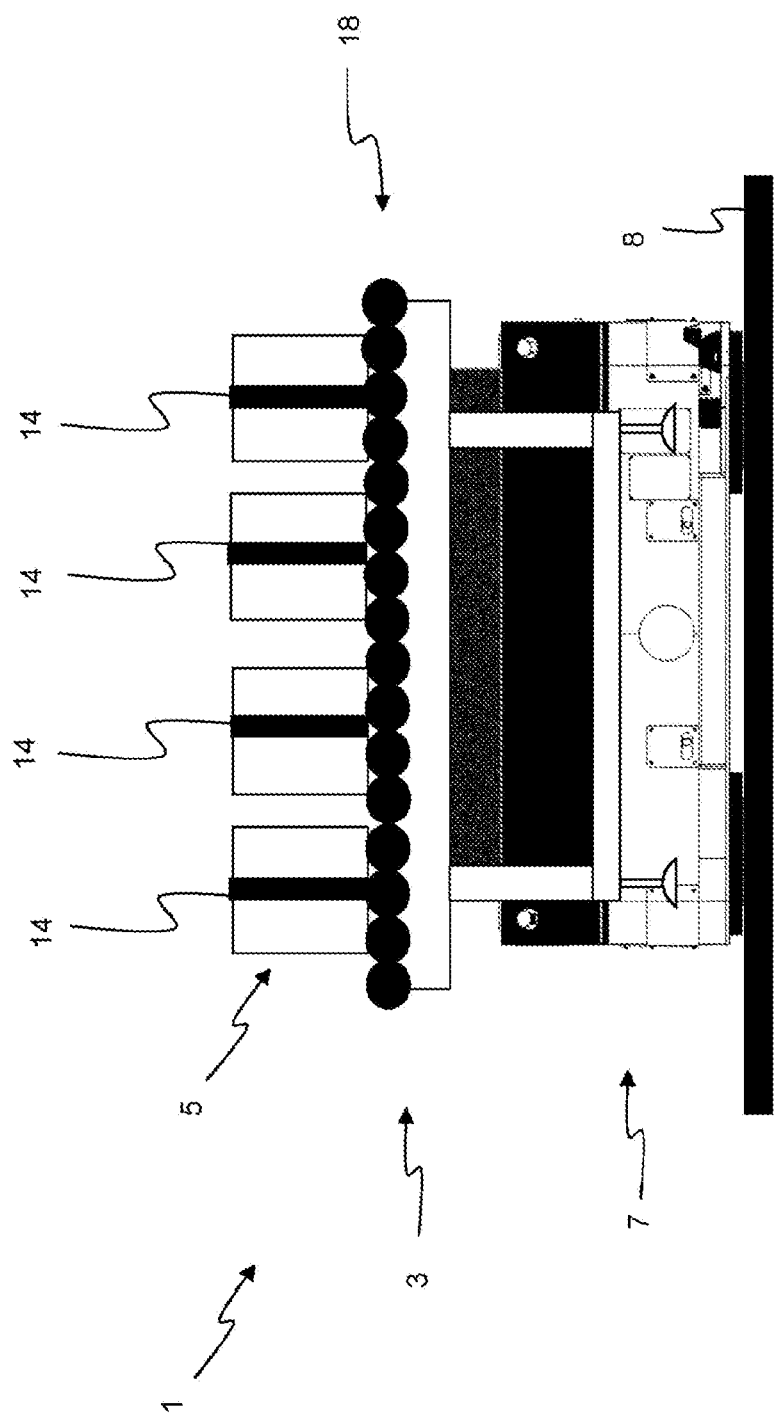

FIG. 17 shows a schematic view of a further embodiment of a transport device 1 according to the invention. The transport device 1 from the exemplary embodiment according to FIG. 17 also comprises a driverless transport vehicle 7 and an adapter 3, which is carried by the driverless transport vehicle 7. The punches 9 provided in the embodiment according to FIG. 16, via which the stacks 5 of planar packaging blanks are fixed in place, are not provided in the embodiment according to FIG. 17.

In the embodiment according to FIG. 17, the planar packaging blanks of a corresponding stack 5 are held together by a strap 14. The strap 14 thereby ensures a high stability of the corresponding stack 5 of planar packaging blanks, so that the individual planar packaging blanks of a corresponding stack 5 remain flush or at least approximately flush even during a movement via the transport device 1.

Figure 18:
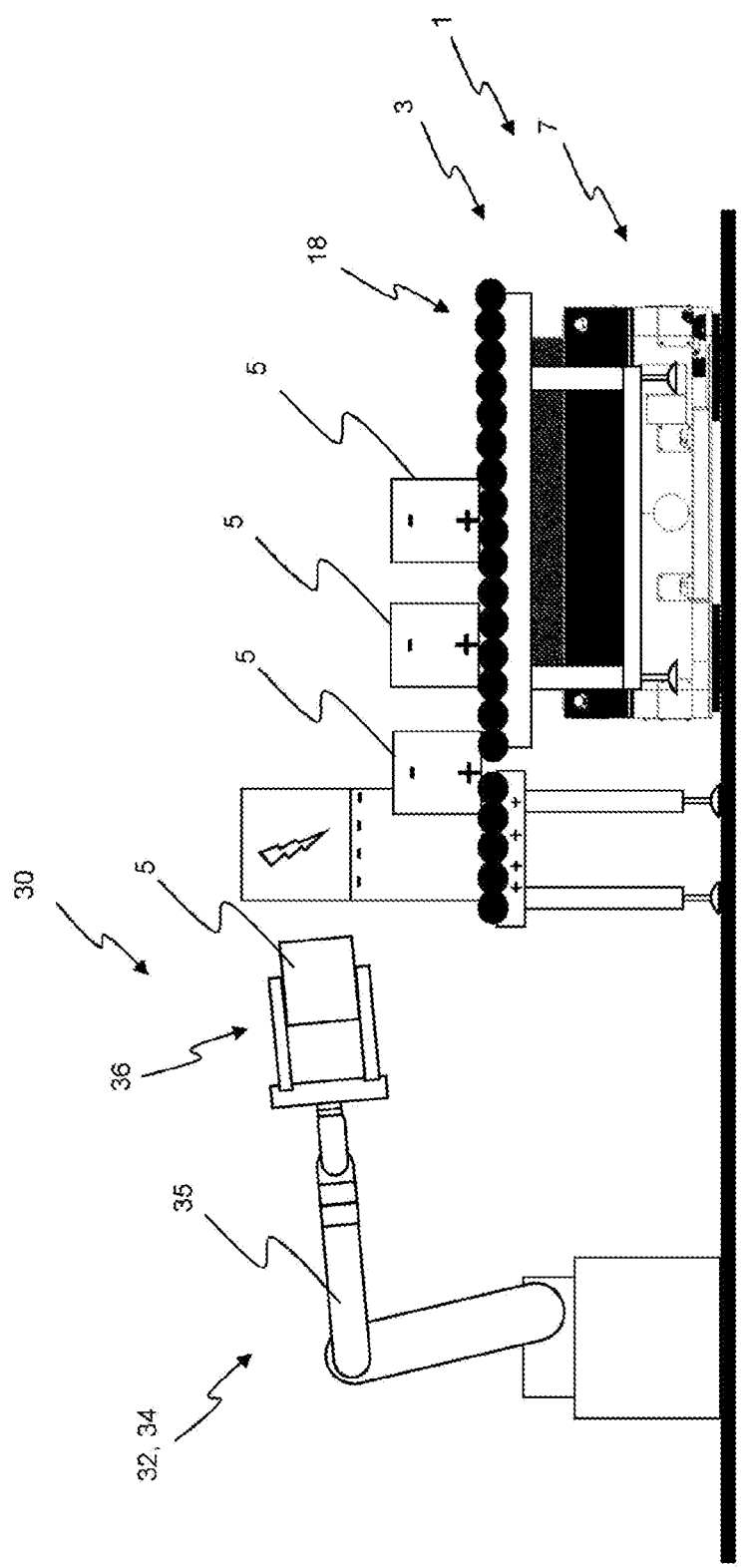
FIG. 18 shows a blank supply and a transport device as can each be provided in various embodiments of a packaging system according to the invention and in various embodiments of the method according to the invention when it is performed.

FIG. 18 shows a blank supply 30 and a transport device 1, as can each be provided in various embodiments of a packaging system according to the invention and in various embodiments of the method according to the invention when it is performed. According to the exemplary embodiment according to FIGS. 1 and 2, the blank supply 30 further comprises a manipulator 32, which is designed as an articulated arm robot 34 and carries a tool 36 for receiving a stack 5 of planar packaging blanks. In the embodiment according to FIG. 18, the stacks 5 of planar packaging blanks are electrostatically charged before being held by the adapter 3. As a result, the planar packaging blanks of a corresponding stack 5 remain aligned flush with one another when the driverless transport vehicle 7, together with the adapter 3 and the held stacks 5 of planar packaging blanks, moves independently or autonomously in the direction of a packaging device.

Figure 19:
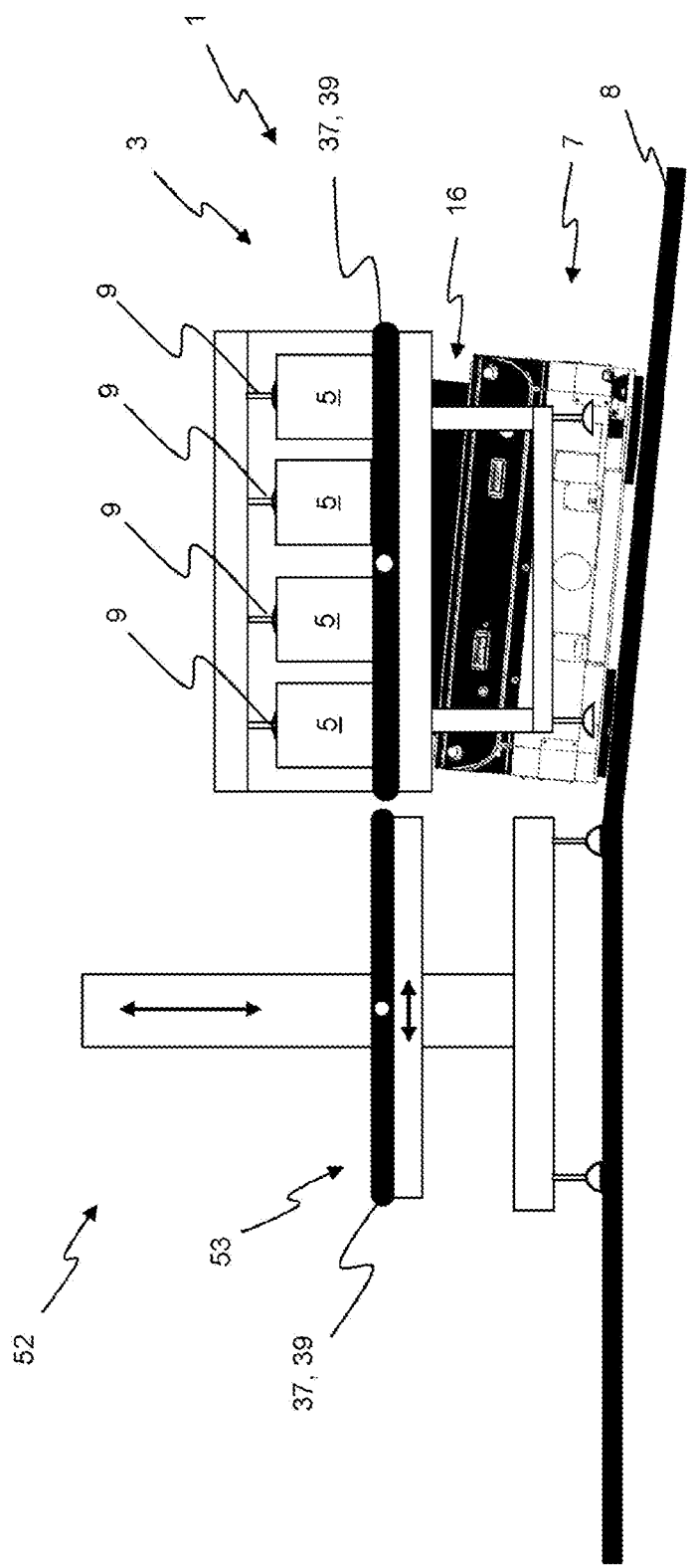
FIGS. 19 to 21 each show a schematic representation of a transfer of a plurality of stacks of planar packaging blanks from an adapter of an embodiment of a transport device according to the invention to a packaging device.
Figure 20:
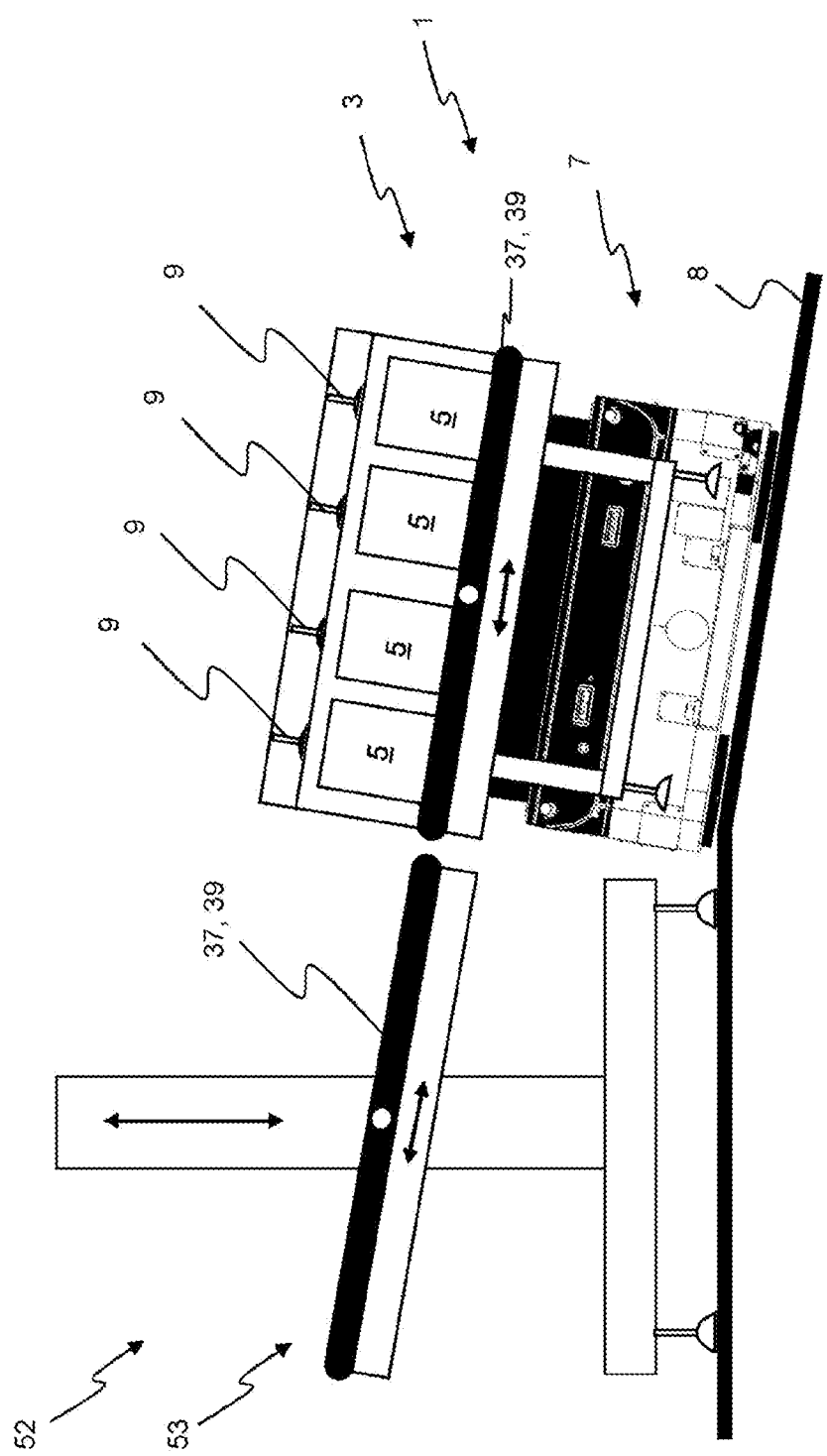
Figure 21:
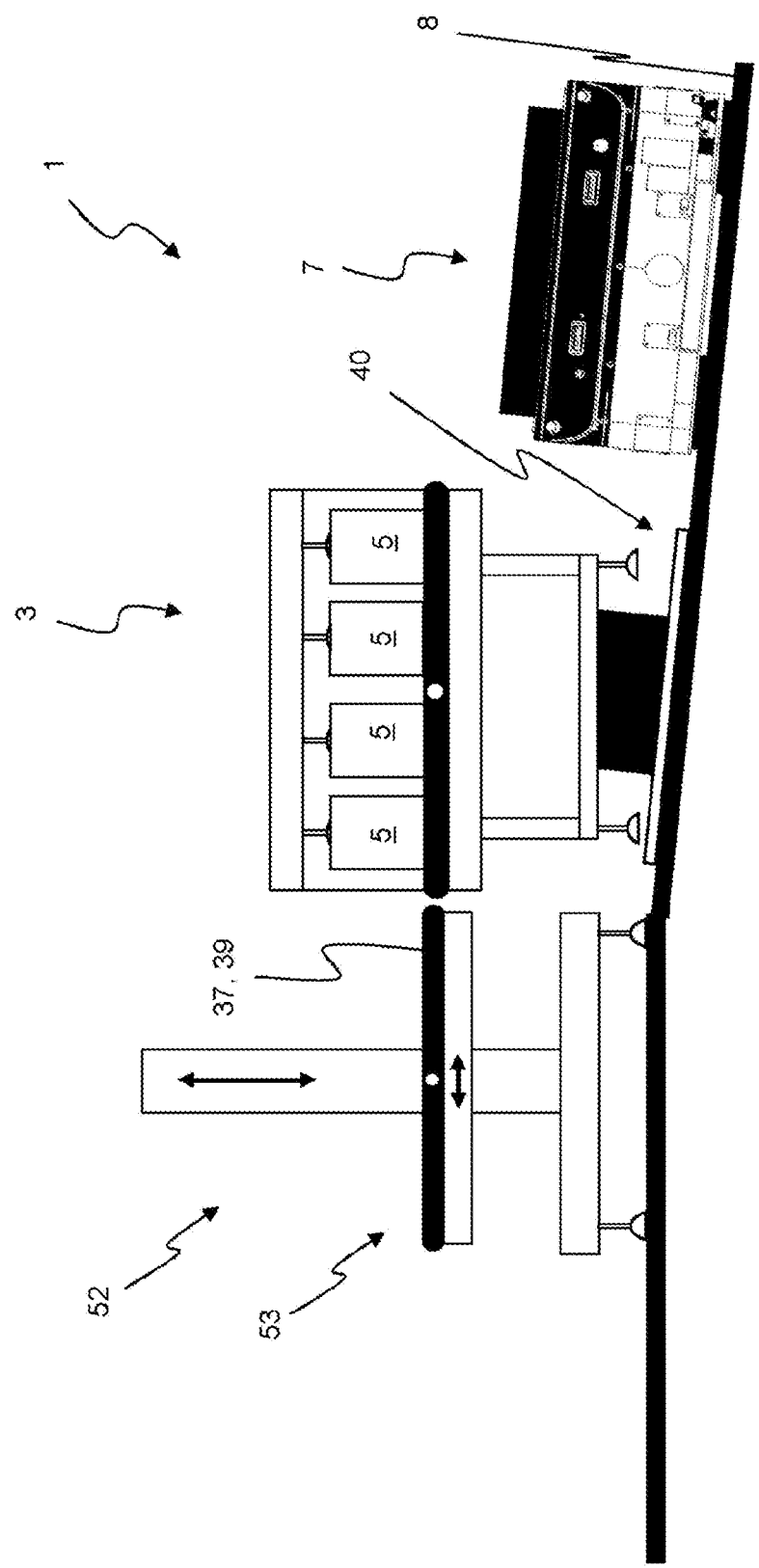

FIGS. 19 to 21 each show a schematic representation of a transfer of a plurality of stacks 5 of planar packaging blanks from an adapter 3 of an embodiment of a transport device 1 according to the invention to a packaging device. The packaging device, which is still not completely shown in FIGS. 19 to 21, comprises a transfer module 50, as has already been shown and described in FIGS. 9 to 12. In FIGS. 19 to 21, only the stack elevator 52 is shown here, wherein a stack buffer 54 and/or a stack centering device 56 and/or a transport belt 58 arranged downstream of the stack centering device 56 can also be provided, which transport belt 58 moves the stacks 5 of planar packaging blanks in the direction of a packaging module. For the design of the complete transfer module 50, of which only the stack elevator 52 is shown in FIG. 19, reference can therefore be made to the above description of FIGS. 9 to 12. The complete packaging device can also be seen in FIGS. 25 to 27 with reference to numeral 2.

As can be seen from FIG. 19, the floor surface 8 is tilted relative to horizontal in a region on which the transport device 1 stands. When the stacks 5 of planar packaging blanks held via the adapter 3 are transferred to the platform 53 of the stack elevator 52, it is necessary for the circulatingly driven conveyor 37 of the adapter 3 and the circulatingly driven conveyor 37 of the platform 53 to be located in a common plane or oriented in alignment with one another. In order to be able to ensure such an orientation even in the case of slanted ground conditions, the driverless transport vehicle 7 of the transport device 1 has a tilt mechanism 16. Via the tilt mechanism 16, the driverless transport vehicle 7 can pivot the adapter 3 about a horizontally oriented axis until the circulatingly driven conveyor 37 of the adapter 3 and the circulatingly driven conveyor 37 of the platform 53 are located in a common plane. Subsequently, the stacks 5 of planar packaging blanks are transferred from the adapter 3 to the platform 53.

FIG. 20 shows a further possibility by which the transport device 1 in various embodiments can reliably transfer stacks 5 of planar packaging blanks to the platform 53 of the stack elevator 52 even in the case of slanted floor conditions. As can be seen from FIG. 20, the circulatingly driven conveyor 37 remains oriented parallel to the floor surface 8 or is not pivoted according to FIG. 19 even in the case of slanted floor conditions. In order for the stacks 5 of planar packaging blanks to be reliably transferrable from the adapter 3 to the platform 53, in the embodiment according to FIG. 20, the platform 53 can be pivoted about a horizontally oriented axis until the circulatingly driven conveyor 37 of the platform 53 and the circulatingly driven conveyor 37 of the adapter 3 are located in one plane or are oriented in alignment with one another. The stacks 5 of planar packaging blanks can then be brought from the adapter 3 to the platform 53.

FIG. 21 shows a further possibility by which the transport device 1 can reliably transfer stacks 5 of planar packaging blanks to the platform 53 of the stack elevator 52 in various embodiments even in the case of slanted floor conditions. In order for the circulatingly driven conveyor 37 of the adapter 3 and the circulatingly driven conveyor 37 of the platform 53 to be aligned with one another or to be located in a common plane even in the case of slanted floor conditions, the adapter 3 is initially set down by the driverless transport vehicle 7 on a docking station 40. The docking station 40 can tilt the adapter 3 about a horizontally oriented axis until the circulatingly driven conveyor 37 of the adapter 3 and the circulatingly driven conveyor 37 of the platform 53 are located in a common plane or are aligned with one another.

The docking station 40 can also be designed in such a way that it can supply electrical energy to the corresponding adapter 3 that is set down on it. In this case, the adapter 3 can have an accumulator, which is charged via the docking station 40. After the adapter 3 has been set down, the driverless transport vehicle 7 can be moved in the direction of a blank supply 30 (cf. FIGS. 1 and 2) and receive a further adapter 3 from there, which adapter is already loaded with stacks 5 of planar packaging blanks. The adapter 3 set down on the docking station 40 can remain on the docking station 40 until its held stacks 5 of planar packaging blanks are required by a packaging device.

Figure 22:
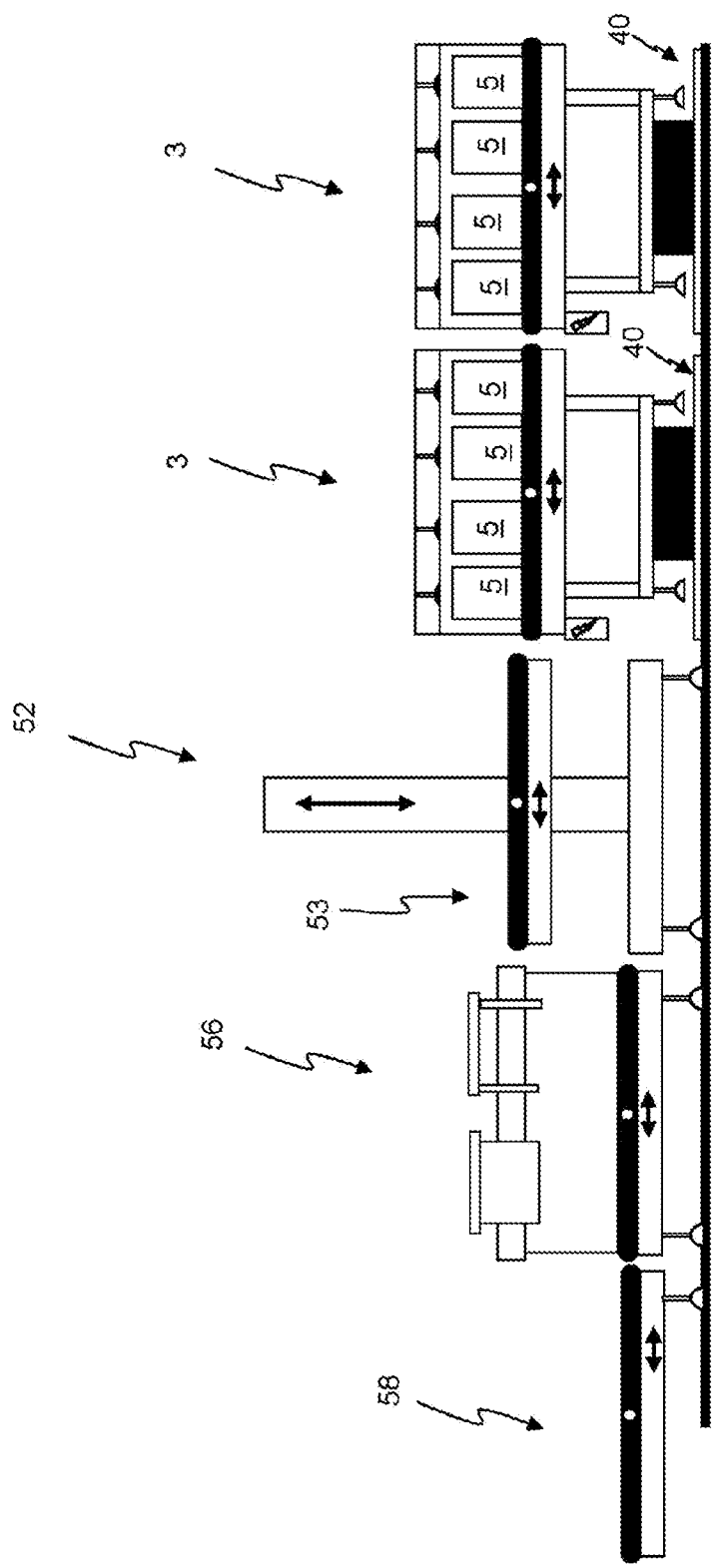
FIGS. 22 and 23 as well as FIG. 24 each show a schematic representation of further aspects as can be provided in various embodiments of a transport device according to the invention, in various embodiments of a packaging system according to the invention and in various embodiments of a method according to the invention.
Figure 23:
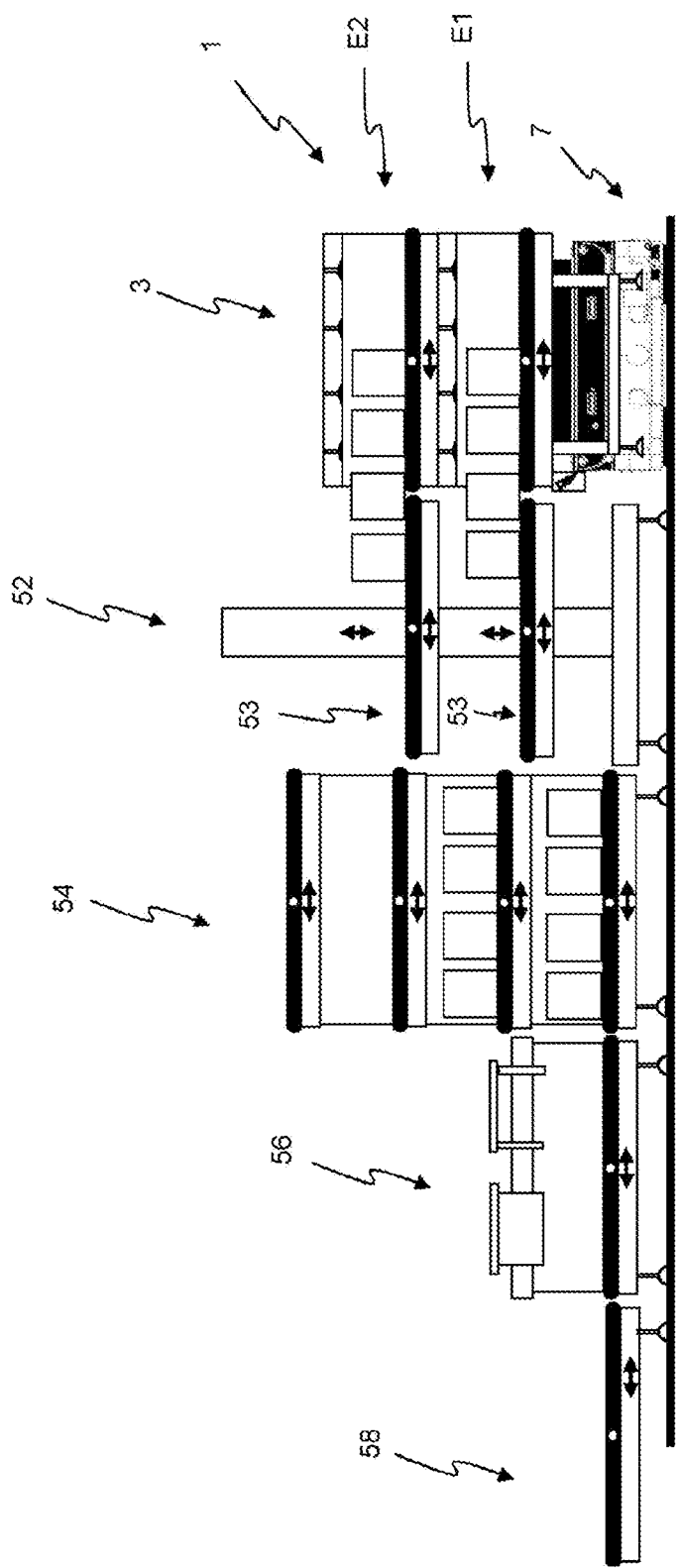

FIGS. 22 and 23 show further embodiments of a transfer module 50, as can be provided as a component of a packaging device or for implementation in various embodiments of the method according to the invention. According to the exemplary embodiment from FIGS. 9 to 12, the transfer module 50 of the embodiment according to FIG. 22 also comprises a stack elevator 52, a stack centering device 56 and a transport belt 58. In addition, the exemplary embodiment of a transfer module 50 according to FIG. 22 comprises two docking stations 40. An adapter 3 was set down on each of these two docking stations 40 by a driverless transport vehicle 7. In FIG. 22, the driverless transport vehicle 7 has already been moved in the direction of a blank supply 30 (cf. FIGS. 1 and 2), while the adapters 3 remain on their corresponding docking station 40. Advantageously, the adapters 3 themselves can thereby form a buffer and the stack 5 still held in FIG. 22 can only be released at a time when a packaging module not shown in FIG. 22 requires a new stack 5 of planar packaging blanks.

The stack buffer 54 provided in FIGS. 9 to 12 can therefore be omitted in embodiments of a transfer module 50 according to FIG. 22, since the stacks 5 of planar packaging blanks are buffered via the adapters 3, which for this purpose stand on a corresponding docking station 40. The corresponding adapter 3 can also be charged or supplied with electrical energy via the corresponding docking station 40. If stacks 5 of planar packaging blanks are required, the platform 53 receives the corresponding stacks 5 from an adapter 3 arranged on a docking station 40.

The platform 53 is then lowered in the vertical direction until the stacks 5 of planar packaging blanks are located at a height level of the transport belt 58. The platform 53 then transfers the stacks 5 of planar packaging blanks to the stack centering device 56, which aligns planar packaging blanks of a corresponding stack flush with one another. From the stack centering device 56, the stacks 5 of planar packaging blanks arrive on the transport belt 58, which moves the stacks 5 of planar packaging blanks in the direction of a packaging module.

In the embodiment according to FIG. 23, a stack buffer is again provided, to which reference is made with numeral 54. The adapter 3 corresponds to the embodiment which has already been described in FIG. 6 and can hold stacks 5 of planar packaging blanks in a plurality of planes E1 and E2, which are offset relative to one another in the vertical direction. Advantageously, a large number of stacks 5 of planar packaging blanks can thereby be transferred to the stack elevator 52 in a relatively short time without the transport device 1 having to be moved back and forth several times between a blank supply 30 (cf. FIGS. 1 and 2) and the transfer module 50 for this purpose.

In order to be able to receive the stacks 5 of planar packaging blanks from the plurality of planes E1 and E2, the stack elevator 52 in the present case comprises two platforms 53 which are height-adjustable in the vertical direction. A respective platform 53 in this case receives all stacks 5 of a corresponding plane E1 or E2. The platforms 53 are then moved again in the vertical direction as needed in order to introduce the received stacks 5 of planar packaging blanks into a free receptacle of the stack buffer 54. The stacks 5 can be removed from the stack buffer 54 if a packaging module (not shown) requires a new stack 5 of planar packaging blanks. For the corresponding procedure, reference can be made to the above description of FIGS. 9 to 12. The removal of all stacks 5 from a receptacle of the stack buffer 54 takes place in FIG. 23 by the lower platform 53 designed as a component of the stack elevator 52.

Figure 24:
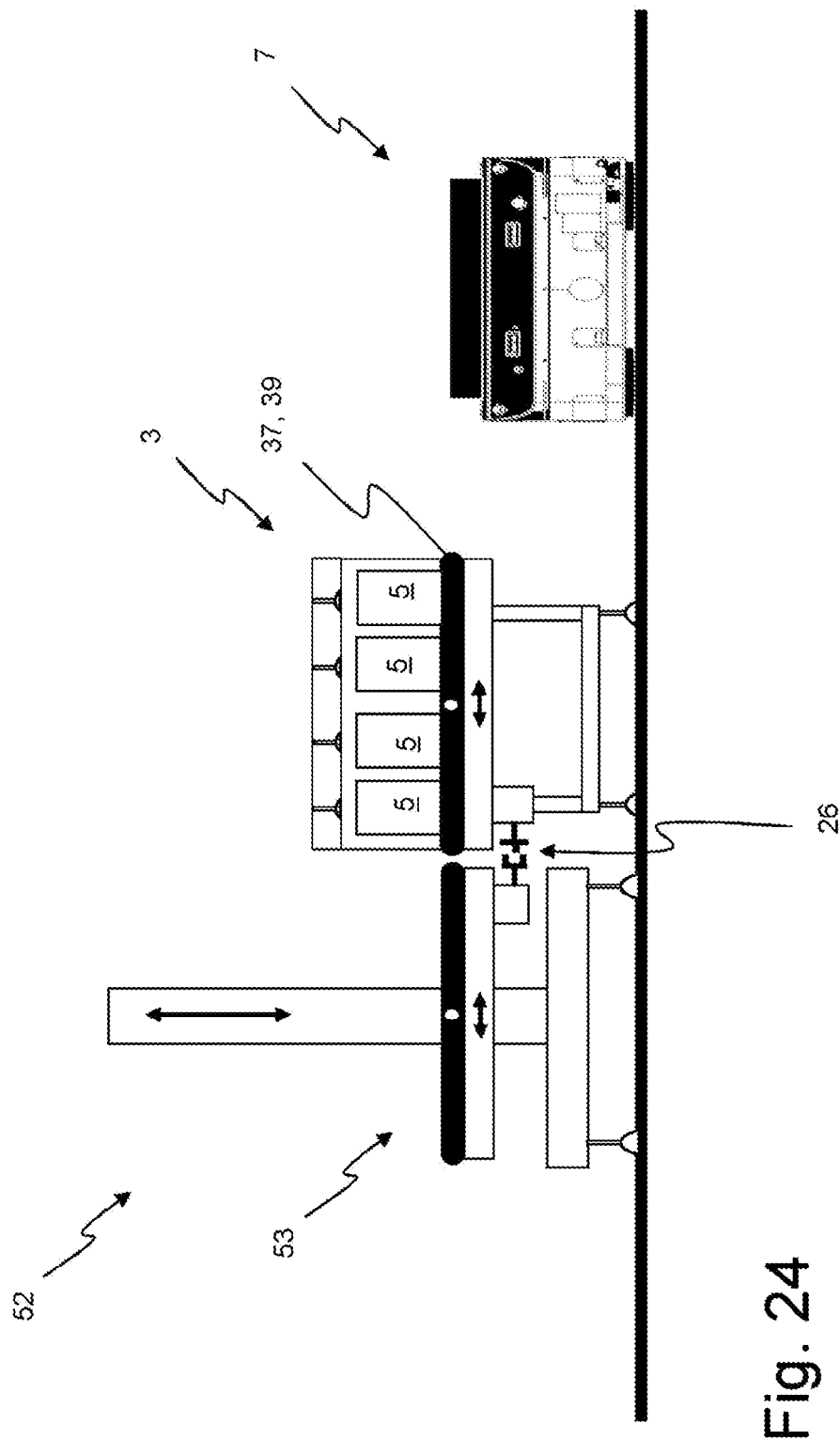

In the further aspects shown in FIG. 24, which can be provided in various embodiments of a packaging system according to the invention and in various embodiments of a method according to the invention, the entire transfer module 50 is not shown. FIG. 24 shows only the stack elevator 52, which can receive the stacks 5 of planar packaging blanks from the adapter 3 via its platform 53. For this purpose, the adapter 3 was previously set down by the driverless transport vehicle 7 in a region close to the stack elevator 52. In the embodiment according to FIG. 24, the adapter 3 then is connected to the stack elevator 52 or to the platform 53 of the stack elevator 52 via a coupling connection 26. The adapter 3 can be supplied with electrical energy via the coupling connection 26. With the electrical energy, the mat belt 39, for example, of the adapter 3 can be driven in a circulating manner in order to transfer the stacks 5 of planar packaging blanks to the platform 53. In further embodiments, it can also be provided that the coupling connection 26 is formed by a mechanical coupling connection. For example, it is conceivable here that such a mechanical coupling connection comprises friction wheels and/or gearwheels which are driven in a circulating manner by an actuator designed as a component of the stack elevator 52 and drive the mat belt 39 of the adapter 3.

FIG. 25 shows a schematic plan view of an embodiment of a packaging system 10 according to the invention. In addition, FIG. 25 shows a schematic plan view of an embodiment of a packaging device 2 according to the invention. FIG. 25 again shows the transfer module 50, which is designed in the present case according to the exemplary embodiment according to FIGS. 9 to 12. In FIG. 25, a transport device 1 approaches the stack elevator 52 of the transfer module 50 in order to transfer stacks 5 of planar packaging blanks held in a further step to the platform 53 of the stack elevator.

The transport device has obtained the stacks 5 of planar packaging blanks from a blank supply 30, which is only indicated schematically in FIG. 25, but can be designed in accordance with the embodiment described above in FIGS. 1 and 2.

FIG. 25 also shows a packaging module 4, to which stacks 5 of planar packaging blanks are supplied via the transport belt 58. The packaging module 4 can remove individual planar packaging blanks from a corresponding stack 5 and package article arrangements together with the removed planar packaging blank. The packaged article arrangements are thereupon transported away from the packaging module 4 in the direction of further handling by the container outlet 42, which can be a transport belt.

FIGS. 26 and 27 show further embodiments of a packaging system 10 according to the invention with a corresponding embodiment of a packaging device 2 according to the invention. In the embodiment according to FIG. 26, the transfer module 50 comprises a receiving apparatus 57, which has a circulatingly driven conveyor 37 or a mat belt 39. The circulatingly driven conveyor 37 or the mat belt 39 of the receiving apparatus 57 can be rotated about a vertical axis. Thus, stacks 5 of planar packaging blanks can be received by the circulatingly driven conveyor 37, whereupon the circulatingly driven conveyor 37 is rotated by 90° about a vertically oriented axis. The stacks 5 of planar packaging blanks can then be transferred from the receiving apparatus 57 to the stack elevator 52. Embodiments according to FIG. 26 are characterized by a very compact design.

In the exemplary embodiment according to FIG. 27, a receiving apparatus 57 is also provided, which can receive stacks 5 of planar packaging blanks. For this purpose, the receiving apparatus 57 comprises a circulatingly driven conveyor 37, which can be moved in the longitudinal direction on rails or tracks. As a result, the circulatingly driven conveyor 37 can be moved in the direction of the transport device 1 in order to receive stacks 5 of planar packaging blanks from the transport device 1. Together with the received stacks 5 of planar packaging blanks, the circulatingly driven conveyor 37 of the receiving apparatus 57 is then moved back into a region close to the stack elevator 52 in order to transfer the received stack 5 of planar packaging blanks to the stack elevator 52.

Figure 28:
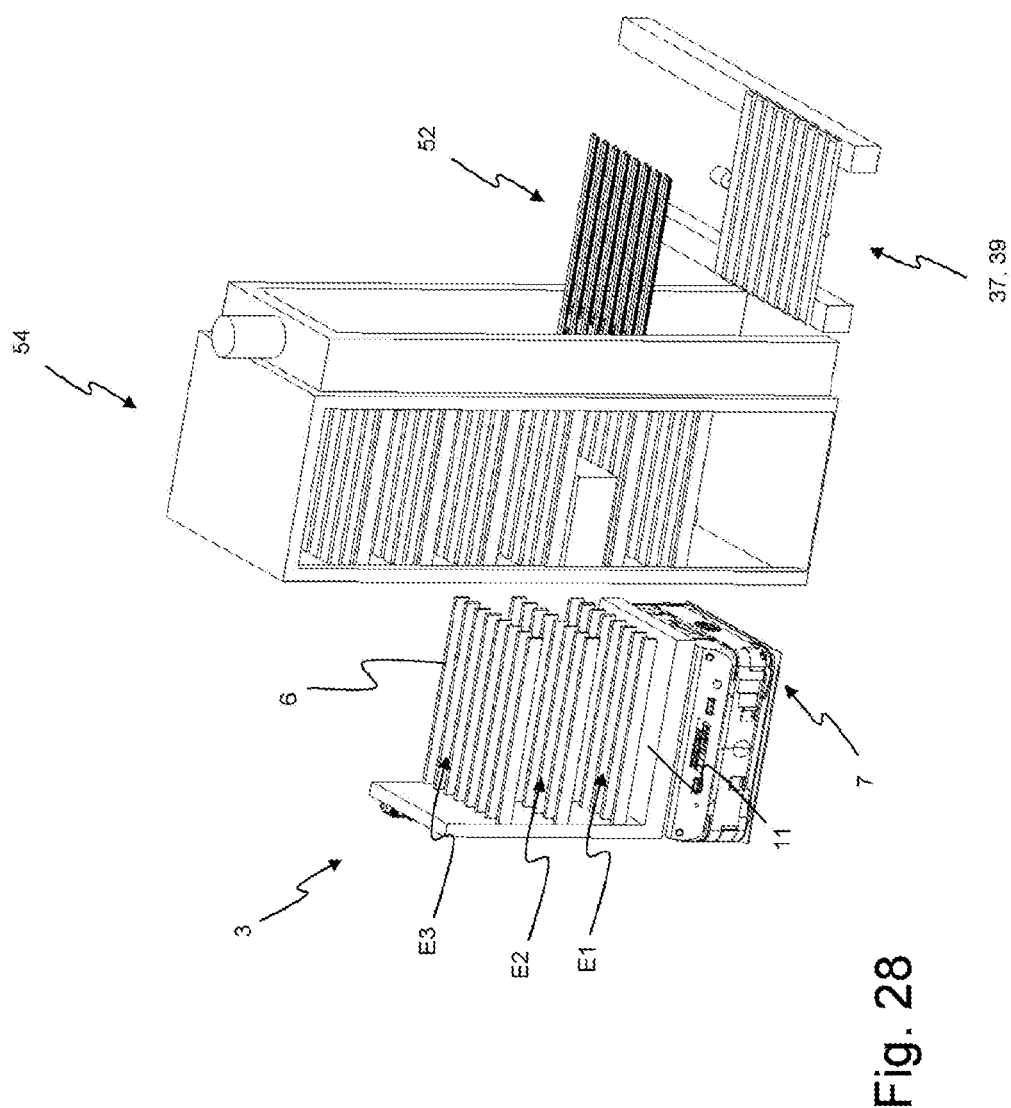
FIG. 28 shows an embodiment of a transport device according to the invention and individual components of an embodiment of a packaging system according to the invention.

FIG. 28 shows an embodiment of a transport device 1 according to the invention and individual components of an embodiment of a packaging system according to the invention. In particular, FIG. 28 also shows an embodiment of a stack buffer, as can be provided in various embodiments of a transfer module 50.

In the present case, the transport device 1 comprises an adapter 3 which, in three planes E1 to E3 offset in the vertical direction relative to one another, can each form at least one stack 5 of planar packaging blanks. Each of the planes E1 to E3 is formed in the adapter 3 by a plurality of fork prongs 6 extending parallel to one another. The entire adapter 3 can be raised in the vertical direction and lowered in the vertical direction by the driverless transport vehicle 7.

A stack buffer 54 and a stack elevator 52 are also shown. The stack buffer 54 forms a plurality of receptacles offset relative to one another in the vertical direction via a plurality of prongs, in each of which at least one stack 5 of planar packaging blanks can be introduced.

If the transport device 1 is located in a region close to the stack buffer 54, the stack elevator 52 can receive, from one of the planes E1 to E3 offset in the vertical direction relative to one another, the stacks 5 of planar packaging blanks correspondingly held therein and introduce them into a free receptacle of the stack buffer 54. For this purpose, the stack elevator 52 can be moved both in the horizontal direction and in the vertical direction. If a packaging module 4 (cf. FIGS. 25 to 27) requires a stack 5 of planar packaging blanks, the stack elevator 52 can remove at least one stack 5 of planar packaging blanks already arranged in a receptacle of the stack buffer 54 from the corresponding receptacle and set it down on the circulatingly driven conveyor 37 or the mat belt 39. To receive the at least one stack 5 of planar packaging blanks, the circulatingly driven conveyor 37 or the mat belt 39 can be raised in the vertical direction, so that the stack elevator 52 can drive under the circulatingly driven conveyor 37 or the mat belt 39.

Figure 29:
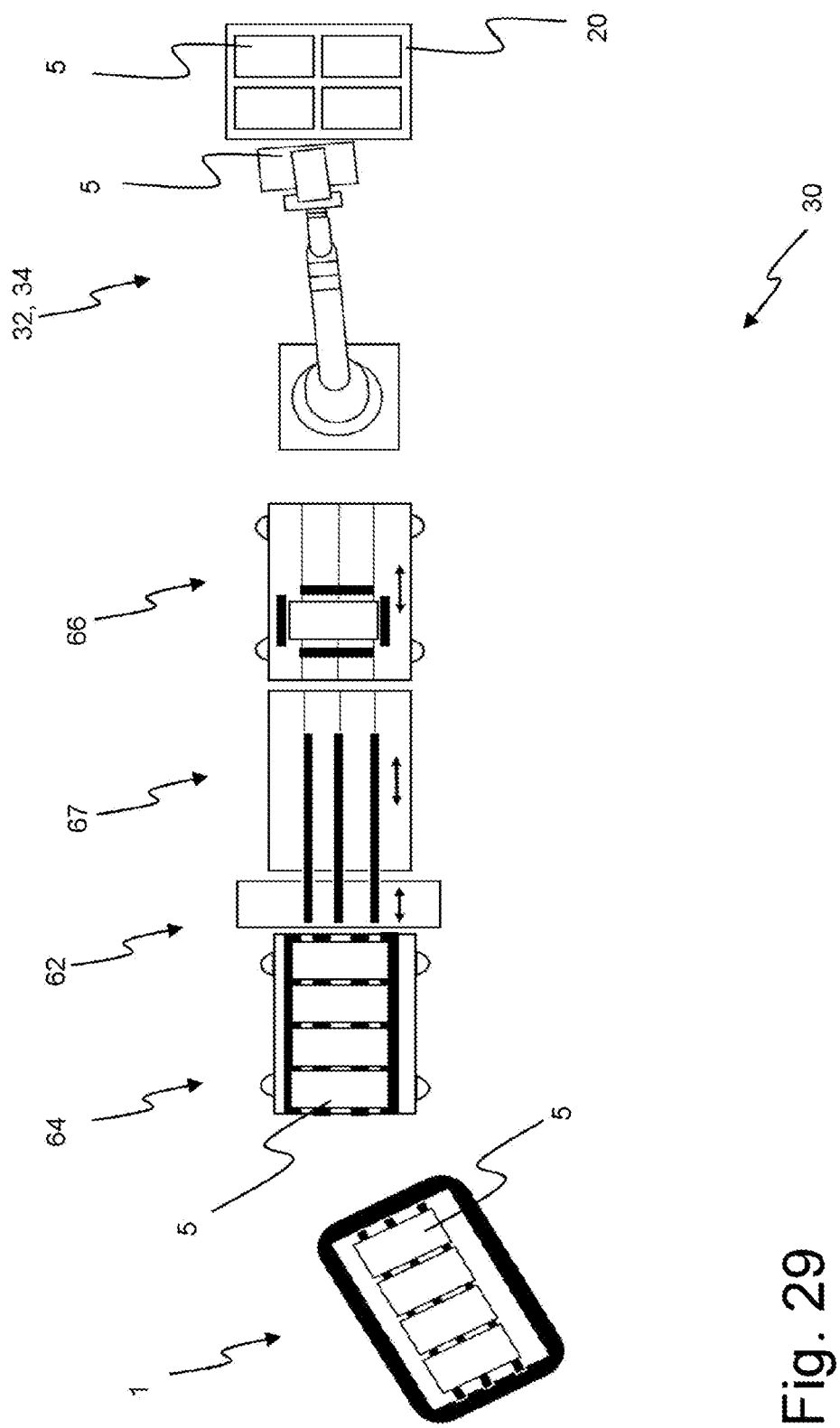
FIG. 29 shows a further embodiment of a blank supply and shows how a transfer of stacks of planar packaging blanks to an embodiment of a transport device according to the invention can take place.

The combination of stack buffer 54, stack elevator 52 and circulatingly driven conveyor 37 or mat belt 39 according to the embodiment according to FIG. 29 can also be designed in various embodiments as a component of a blank supply 30 corresponding to the above description according to FIGS. 1 and 2, so that the use of this feature combination is not limited to embodiments of a transfer module 50.

FIG. 29 shows a further embodiment of a blank supply 30 and shows how a transfer of stacks 5 of planar packaging blanks can take place to an embodiment of a transport device 1 according to the invention. According to the embodiment from FIGS. 1 and 2, a manipulator 32 is also provided in the embodiment according to FIG. 29, which manipulator is designed as an articulated arm robot 34 and can receive stacks 5 of planar packaging blanks from a pallet 20. The stacks 5 of planar packaging blanks received from the pallet 20 are set down by the manipulator 32 on a stack centering device 66, which aligns planar packaging blanks of a corresponding stack 5 flush with one another. The stack centering device 66 then leads the corresponding stacks further to a divided mat belt 67, from which a stack elevator 62, which has a plurality of fork prongs, receives the corresponding stacks 5 of planar packaging blanks and introduces them into a free receptacle of a stack buffer 64. From there, the stacks 5 of planar packaging blanks can be removed as required via the stack elevator 62 and transferred to a corresponding transport device 1.

The invention has been described with reference to a preferred embodiment. However, it is conceivable for a person skilled in the art that modifications or changes can be made to the invention without departing from the scope of protection of the following claims.

It should be expressly mentioned at this point that all aspects and embodiment variants which have been explained in conjunction with the packaging system according to the invention or the transport device according to the invention may equally also relate to, or be, partial aspects of the method according to the invention. Therefore, if the description or the claim definitions pertaining to the packaging system according to the invention or the transport device according to the invention make mention of certain aspects and/or correlations and/or effects, this applies equally to the method according to the invention. The same applies vice versa, so that all aspects and embodiment variants which have been explained in conjunction with the method according to the invention can also relate to, or be, partial aspects of the packaging system according to the invention or the transport device according to the invention. Therefore, if the description or the claim definitions pertaining to the method according to the invention make mention of certain aspects and/or correlations and/or effects, this applies equally to the packaging system according to the invention or the transport device according to the invention.

LIST OF REFERENCE SIGNS 1 transport device
2 packaging device
3 adapter
4 packaging module
5 Stack
6 fork prong (adapter 3)
7 driverless transport vehicle
8 floor surface
9 punch
10 packaging system
13 terminal box
14 strap
15 rotary table
16 tilt mechanism
18 roller track
19 rack
20 pallet
25 stop wall
26 coupling connection
27 optical sensor
28 supporting leg
29 plug connection
30 blank supply
31 centering apparatus
32 manipulator 34 articulated arm robot
36 tool
35 working arm
37 circulatingly driven conveyor
38 holding region
39 mat belt
40 docking station
41 removal region
42 container outlet
43 fork prong
50 transfer module
51 lifting mechanism
52 stack elevator
53 platform
54 stack buffer
56 stack centering device
57 receiving apparatus
58 transport belt
62 stack elevator
64 stack buffer
66 stack centering device
E1 first plane
E2 second plane
E3 third plane
FP free position

The invention claimed is:

1. A transport device (1) for planar packaging blanks comprising:
at least one driverless transport vehicle (7) and
at least one adapter (3), wherein the at least one driverless transport vehicle (7) is capable of carrying the at least one adapter (3),
wherein the at least one adapter (3) is capable of holding at least one stack (5) of planar packaging blanks,
wherein the at least one adapter (3) or the at least one driverless transport vehicle (7) has a tilt mechanism (16) via which the at least one stack (5) of planar packaging blanks can be pivoted about a horizontally oriented axis.

2. The transport device of claim 1, wherein the at least one driverless transport vehicle (7) and the at least one adapter (3) can be separated from one another.

3. The transport device of claim 2, wherein the at least one adapter (3) comprises at least one circulatingly driven conveyor (37) for moving at least one corresponding held stack (5) of planar packaging blanks.

4. The transport device of claim 3, wherein the at least one adapter (3) is capable of fixing in place at least one held stack (5) of planar packaging blanks, and comprises at least one liftable and lowerable punch (9), wherein the at least one lifting and lowerable punch (9) is applying force onto a topmost planar packaging blank of the at least one held stack (5) of planar packaging blanks.

5. The transport device of claim 1, wherein the at least one driverless transport vehicle (7) and the at least one adapter (3) are coupled to one another via an interface for data exchange, for electrical power supply, or are coupled together pneumatically.

6. The transport device of claim 1, wherein
the at least one driverless transport vehicle (7) or the at least one adapter (3) has a lifting mechanism (51), wherein the at least one adapter (3) can be lifted relative to the at least one driverless transport vehicle (7) for independent reception, so that the at least one adapter (3) loses a surface contact with a floor surface existing up to that point or wherein:
the at least one driverless transport vehicle (7) and the at least one adapter (3) interact via a centering mechanism, which centering mechanism can align the at least one adapter (3) relative to the at least one driverless transport vehicle (7) in the case of independent reception via the at least one driverless transport vehicle (7) or wherein:
the at least one driverless transport vehicle (7) and the at least one adapter (3) interact via a clamping bolt and a clamping mechanism, via which clamping bolt and clamping mechanism the at least one adapter (3) can be fixed at least largely immovably on the at least one driverless transport vehicle (7).

7. The transport device of claim 1, wherein the at least one adapter (3) is capable of holding at least two stacks (5) of planar packaging blanks in at least two planes (E1, E2) which are offset relative to one another in the vertical direction.

8. The transport device of claim 1, wherein the at least one adapter (3) has a plurality of fork prongs (6), which are capable of holding the at least one stack (5) of planar packaging blanks.

9. The transport device claim 1, further comprising a multi-axis robot arranged on the at least one adapter (3) or on the at least one driverless transport vehicle (7) and is capable of gripping at least one stack (5) of planar packaging blanks to be held and of positioning a gripped stack (5) of planar packaging blanks on the at least one adapter (3).

10. A transport device (1) for planar packaging blanks, comprising:
at least one driverless transport vehicle (7) and
at least one adapter (3), wherein the at least one driverless transport vehicle (7) is capable of carrying the at least one adapter (3),
wherein the at least one adapter (3) is capable of holding at least one stack (5) of planar packaging blanks,
wherein:
the at least one driverless transport vehicle (7) is capable of independently receiving an adapter (3) or wherein:
the at least one driverless transport vehicle (7) is capable of independently setting down an adapter (3) carried up to then by the at least one driverless transport vehicle (7).

11. A packaging system (10) comprising:
at least one packaging device (2) capable of packaging article arrangements with planar packaging blanks, comprising:
at least one blank supply (30) with at least one stack (5) of planar packaging blanks, and
at least one transport device (1) having at least one driverless transport vehicle (7) and at least one adapter (3),
at least one first packaging device (2) capable of packaging article arrangements with planar packaging blanks, and
at least one second packaging device (2) capable of packaging further article arrangements with planar packaging blanks,
wherein the at least one specific driverless transport vehicle (7) is capable of bringing a corresponding stack (5) of planar packaging blanks from the at least one blank supply (30) to either the at least one first packaging device (2) or to the at least one second packaging device (2) via a corresponding carried adapter (3).

12. The packaging system of claim 11, wherein the packaging device (2) further comprises at least one stack buffer (54), which has a plurality of receptacles arranged one above the other in the vertical direction, wherein the receptacles are capable of storing at least one stack (5) of planar packaging blanks, and the packaging device (2) further comprises at least one stack elevator (52), via which stacks (5) of planar packaging blanks can be introduced into the receptacles.

13. A method for operating a packaging system (10) comprising:
   transferring at least one stack (5) of planar packaging blanks provided via at least one blank supply (30) to the at least one packaging device (2),
   by carrying at least one adapter (3) with at least one driverless transport vehicle (7), wherein the at least one adapter (3) holds at least one stack (5) of planar packaging blanks, and
   bringing the driverless transport vehicle (7) from the at least one blank supply (30) to the at least one packaging device (2),
   transferring the stack (5) of planar packaging blanks, which is still held via the at least one adapter (3) until then, from the at least one adapter (3) to the at least one packaging device (2), and
   packaging, with the at least one packaging device (2), article arrangements with planar packaging blanks of the transferred stack (5),
   wherein the at least one adapter (3) holds a plurality of stacks (5) of planar packaging blanks in at least two planes (E1, E2) offset relative to one another in the vertical direction, and the plurality of stacks (5) of planar packaging blanks are brought by the at least one driverless transport vehicle (7) from the at least one blank supply (30) to the at least one packaging device (2), whereupon the plurality of stacks (5) of planar packaging blanks, which are still held until then by the at least one adapter (3), are transferred from the at least one adapter (3) to the at least one packaging device (2).

14. The method of claim 13, wherein the transferring step comprises driving at least one conveyor (37), a component of the at least one adapter (3), in a circulating manner, resulting in the stack (5) of planar packaging blanks being transferred to the at least one packaging device (2).

15. The method of claim 13, further comprising:
   providing stacks (5) of planar packaging blanks already held by the at least one adapter (3), and
   driving the at least one driverless transport vehicle (7) under the at least one adapter (3) together with the stack (5) of planar packaging blanks,
   raising the at least one adapter (3) together with the stack (5) of planar packaging blanks already held, so that the at least one adapter (3) thereby loses its contact with a support surface and is then carried via the at least one driverless transport vehicle (7).

16. The method of claim 13, wherein the at least one adapter (3) fixes in place the at least one held stack (5) of planar packaging blanks and comprises at least one liftable and lowerable punch (9), wherein the at least one liftable and lowerable punch (9) presses against a topmost planar packaging blank of the at least one held stack (5) of planar packaging blanks in a force-applying manner.

17. The method of claim 13, wherein the transferring step further comprises:
   providing the at least one packaging device (2) with at least one stack buffer (54), which has a plurality of receptacles arranged one above the other in the vertical direction,
   providing a stack elevator (52) with a platform (53) on the at least one adapter (3),
   bringing the stack (5) of planar packaging blanks to a vertical height level of a specific receptacle of the plurality of receptacles in the at least one stack buffer (54) via the platform (53) of the stack elevator (52), and
   introducing and storing the stack of (5) of planar packaging blanks, into the specific receptacle at the specific vertical level until planar packaging blanks of the stored stack (5) are required for packaging article arrangements.

\* \* \* \* \*